(12) United States Patent
Togita

(10) Patent No.: US 10,638,162 B2
(45) Date of Patent: Apr. 28, 2020

(54) CODING METHOD AND DECODING PROCESSING METHOD

(71) Applicant: CANON KABUSHIKI KAISHA, Tokyo (JP)

(72) Inventor: Koji Togita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 49 days.

(21) Appl. No.: 15/295,249

(22) Filed: Oct. 17, 2016

(65) Prior Publication Data

US 2017/0118491 A1 Apr. 27, 2017

(30) Foreign Application Priority Data

Oct. 23, 2015 (JP) .................................. 2015-209179

(51) Int. Cl.
| | | |
|---|---|---|
| *H04N 19/63* | (2014.01) | |
| *H04N 19/127* | (2014.01) | |
| *H04N 19/146* | (2014.01) | |
| *H04N 19/186* | (2014.01) | |
| *H04N 19/132* | (2014.01) | |
| *H04N 19/169* | (2014.01) | |
| *H04N 19/15* | (2014.01) | |

(52) U.S. Cl.
CPC .......... *H04N 19/63* (2014.11); *H04N 19/127* (2014.11); *H04N 19/132* (2014.11); *H04N 19/146* (2014.11); *H04N 19/15* (2014.11); *H04N 19/186* (2014.11); *H04N 19/1883* (2014.11)

(58) Field of Classification Search
CPC .. H04N 19/63; H04N 19/1883; H04N 19/132; H04N 19/15; H04N 19/127; H04N 19/146; H04N 19/186
See application file for complete search history.

(56) References Cited

U.S. PATENT DOCUMENTS

| | | | | |
|---|---|---|---|---|
| 5,353,059 A | * | 10/1994 | Lawlor | ................. H04N 5/926 348/607 |
| 5,748,245 A | * | 5/1998 | Shimizu | ............... H04N 19/176 375/240.03 |
| 6,154,493 A | * | 11/2000 | Acharya | ................ H04N 1/648 348/398.1 |
| 8,218,882 B2 | | 7/2012 | Sato | |
| 8,363,717 B2 | | 1/2013 | Togita et al. | ............ 375/240.03 |
| 9,319,682 B2 | | 4/2016 | Togita | |
| 9,674,554 B2 | * | 6/2017 | Eslami | ................... H04N 19/13 |

(Continued)

FOREIGN PATENT DOCUMENTS

| | | |
|---|---|---|
| JP | 2004-297195 | 10/2004 |
| JP | 2008-228208 A | 9/2008 |

OTHER PUBLICATIONS

U.S. Appl. No. 15/357,634, filed Nov. 21, 2016.

*Primary Examiner* — Ming Y Hon

(74) *Attorney, Agent, or Firm* — Venable LLP

(57) ABSTRACT

A frequency transformation unit executes discrete wavelet transformation processing on image data, quantizes the output of sub-bands of each component using a quantization unit, and performs entropy coding using a coding unit. If a total code amount of the image data that has been coded exceeds a maximum value that has been set, an overflow control unit replaces the coded data with copy data obtained by coding 0 in order from sub-bands having the lowest priority, until the total code amount is less than or equal to the maximum value.

26 Claims, 18 Drawing Sheets

(56) References Cited

U.S. PATENT DOCUMENTS

| | | | |
|---|---|---|---|
| 2001/0028748 A1* | 10/2001 | Sato | H04N 19/63 382/239 |
| 2002/0154823 A1* | 10/2002 | Okada | H04N 19/172 382/233 |
| 2004/0136596 A1* | 7/2004 | Oneda | H04N 19/63 382/232 |
| 2004/0264785 A1* | 12/2004 | Suino | H04N 19/176 382/232 |
| 2005/0078873 A1* | 4/2005 | Cetin | H04N 19/61 382/236 |
| 2005/0100226 A1* | 5/2005 | Kajiwara | H04N 19/176 382/232 |
| 2005/0111740 A1* | 5/2005 | Sakuyama | H04N 19/15 382/232 |
| 2005/0141774 A1* | 6/2005 | Deever | H04N 19/647 382/240 |
| 2007/0165725 A1* | 7/2007 | Krishnamurthy | H04N 19/147 375/240.26 |
| 2008/0226187 A1 | 9/2008 | Sato | |
| 2011/0032413 A1* | 2/2011 | Kulkarni | G03B 13/36 348/351 |
| 2012/0057800 A1* | 3/2012 | Guleryuz | H04N 19/46 382/233 |
| 2013/0177074 A1 | 7/2013 | Togita et al. | |
| 2015/0092076 A1* | 4/2015 | Campbell | G06T 3/4015 348/222.1 |

\* cited by examiner

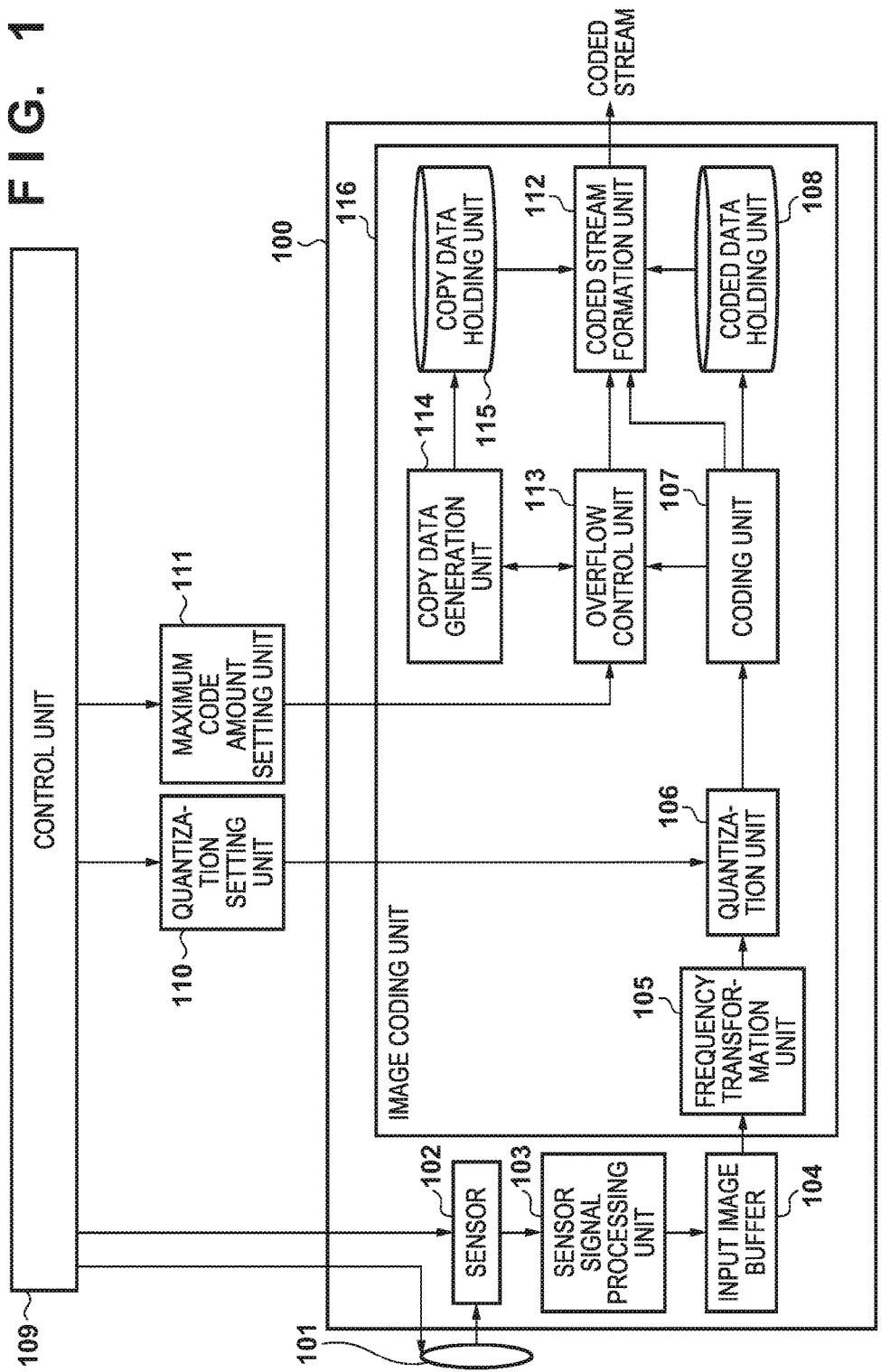

1 FRAME IMAGE

PIXEL PLANES

BAYER ARRAY

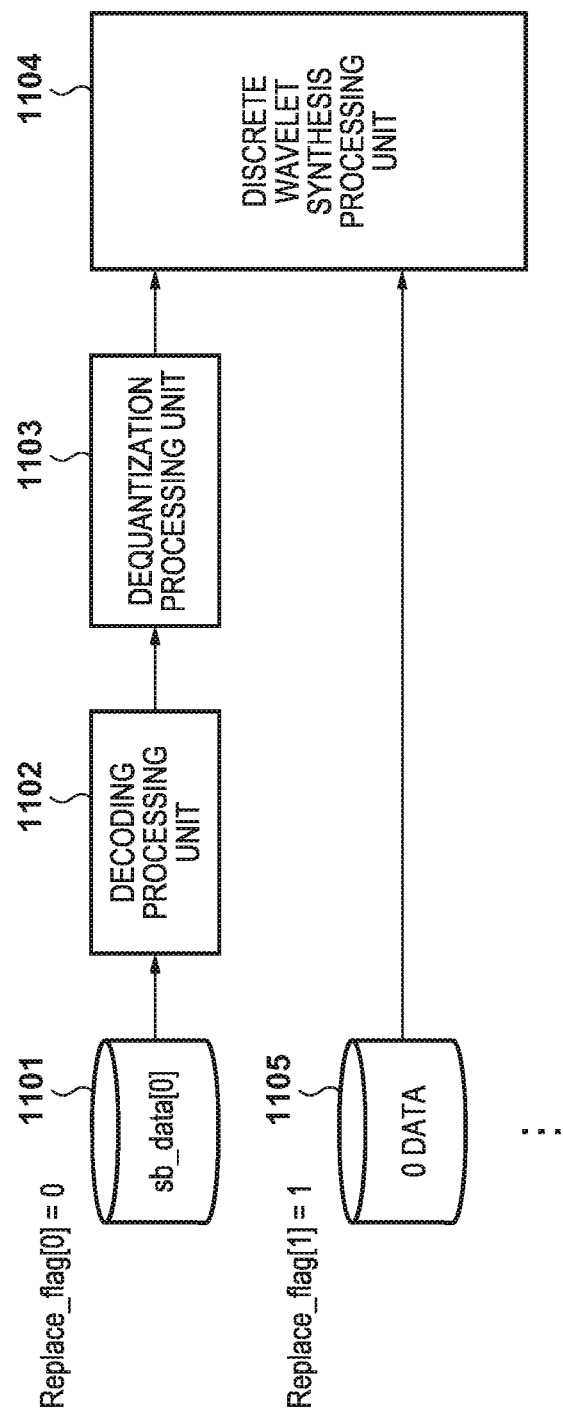

FIG. 19

CODING METHOD AND DECODING PROCESSING METHOD

BACKGROUND OF THE INVENTION

Field of the Invention

The present invention relates to a coding method and a decoding processing method, and in particular, relates to a technique for handling the recording of a RAW image of a moving image or a still image.

Description of the Related Art

In a conventional image capturing apparatus, raw image information (RAW image) captured by an imaging sensor is debayered (demosaiced), the debayered raw image information is converted to signals constituted by a luminance signal and a color difference signal, and so-called development processing such as denoising, optical distortion correction, and image optimization is performed on each signal. In general, the luminance signal and the color difference signal that have been subjected to the development processing are then compressed and coded, and recorded on a recording medium. On the other hand, there are image capturing apparatuses that are capable of recording a RAW image. Although the data amount that needs to be recorded is extremely large with a RAW image, there are advantages in that correction and deterioration of the original image are suppressed to a minimum and the RAW image can be edited after image capture, and thus experienced users with editing skills prefer to use RAW images. Also, in recent years, recording of RAW images has been applied to not only still images but also moving images. When recording a moving image as a RAW image, it is necessary to perform control for compressing the data amount to a desired code amount so as to record a moving image having a given time length on a predetermined recording medium.

However, if the code amount control and quantization control are not appropriately performed, a data amount that exceeds the transfer rate to the predetermined recording medium occurs, resulting in the data on the recording medium being corrupted. Also, even if the RAW data is written on the recording medium, if the bit rate guaranteed for real-time reproduction is exceeded, this data cannot be correctly reproduced by a reproduction device. In readiness for such cases, it is necessary to provide a mechanism that is able to reduce the data amount after coding. As a method for compressing RAW images, it is thought that a method, such as JPEG 2000, that involves breaking the data into sub-bands, which are frequency bands, using frequency transformation such as wavelet transformation, and compressing each sub-band, such that no block distortion occurs due to coding, rather than compressing the data by performing DCT in block units, is suitable. A configuration of an image capturing apparatus that can reduce the data amount after coding in JPEG 2000 is described in Japanese Patent Laid-Open No. 2004-297195, for example. In JPEG 2000, EBCOT (Embedded Block Coding with Optimized Truncation), which is embedded coding, is adopted in compression coding, and coding is performed in bit plane units per rectangular block in a screen, thus providing a mechanism that discards bit planes having a low importance after coding. Also, there is a mechanism that has a layer structure and discards layers having a low importance, and by using these techniques, the data amount can be reduced after coding.

However, because EBCOT has a heavy processing load and has an extremely large computation amount, it is difficult to apply EBCOT to all of the coding, and thus, in particular, EBCOT is not suitable for an embedded device that needs to perform real-time processing. Also, if a layer structure is adopted, overheads occur, and thus the layer structure is not always used.

The technique described in Japanese Patent Laid-Open No. 2004-297195 is such that the priorities are given to sub-bands, coded streams are configured in order, and if data exceeds a predetermined size, the subsequent data is truncated by inserting an end code, and, at the time of reproduction, decoding processing is performed with the data after the end code set to 0 data. There are problems in that this decoding processing needs a special decoder, and in particular, if a plurality of sub-bands are truncated, the truncated sub-bands cannot be comprehended without retrieving the end code from the data.

SUMMARY OF THE INVENTION

The present invention provides a coding method and a decoding method, that are able to adjust a data amount after coding without using EBCOT, which is embedded coding that has a heavy processing load, and to generate a reproducible coded stream with normal processing of a decoder or by adding simple processing to a decoder.

The present invention has the following configuration.

According to the first aspect of the present invention, there is provided a coding method comprising: performing wavelet transformation per component of image data; coding the transformed data per sub-band; and determining whether or not a total code amount obtained by the coding of the image data exceeds a threshold value, and if it is determined that the total code amount exceeds the threshold value, replacing coded data with predetermined data or discarding the coded data in units of the sub-bands such that the total code amount is less than or equal to the threshold value.

According to another aspect of the present invention, there is provided a decoding processing method comprising: performing decoding processing on coded data obtained by coding a plurality of sub-bands of image data, per sub-band, and acquiring coefficient data; and executing inverse wavelet transformation on the acquired coefficient data, and acquiring image data, wherein if a sub-band that is to undergo the decoding processing is provided with predetermined data, inverse wavelet transformation of the sub-band is executed with all pieces of the coefficient data set to 0.

According to the present invention, it is possible to adjust the data amount after a RAW image has been coded, with a simple mechanism.

Further features of the present invention will become apparent from the following description of exemplary embodiments with reference to the attached drawings.

BRIEF DESCRIPTION OF THE DRAWINGS

FIG. 1 is a block diagram showing a configuration example of an image capturing apparatus according to an embodiment of the present invention.

FIG. 11 is a block diagram showing a configuration example of a reproduction device that can reproduce a coded stream in the second embodiment.

FIG. 19 is a conceptual diagram showing a structure of a coded stream in the fifth embodiment.

DESCRIPTION OF THE EMBODIMENTS

First Embodiment

Figure 2B:
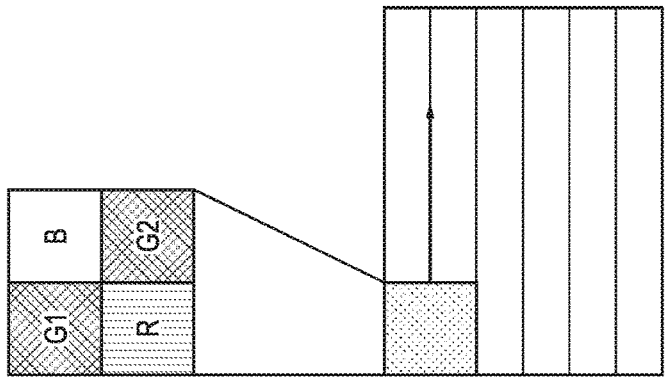
FIGS. 2A, 2B, and 2C are diagrams showing a pixel array in a first embodiment.

Hereinafter, an embodiment of the present invention will be described in detail with reference to the drawings. FIG. 1 is a block diagram showing a configuration example of an image capturing apparatus according to an embodiment of the present invention. This coding device generates and records a coded stream by performing coding through dividing an input video into blocks having variable sizes.

Coding Processing

In FIG. 1, a control unit 109 includes a CPU and a memory for storing a control program that is executed by the CPU, and controls overall processing of an image capturing apparatus 100. When an instruction to start an image capture operation is given, an optical image of a subject that is to be captured is input via an image capture optical unit 101, and the optical image is formed on an imaging sensor unit 102. The imaging sensor unit 102 transforms light that has passed through red, green and blue (RGB) color filters that are disposed in respective pixels into electrical signals. FIG. 2A is an example of color filters that are disposed in the imaging sensor unit 102, and shows a pixel array of an image handled by the image capturing apparatus 100. As shown in FIG. 2A, red (R), green (G), and blue (B) are disposed in respective pixels in a mosaic form, and the pixel array has a structure in which one set of four pixels (2×2) including 1 red pixel, 1 blue pixel, and two green pixels are regularly arranged. Such a pixel array is generally called a Bayer array.

A sensor signal processing unit 103 performs pixel repair processing on electrical signals that have been transformed by the imaging sensor unit 102. The repair processing includes processing performed in the imaging sensor unit 102 on defective pixels and pixels with low reliability, such as interpolating pixels to be repaired using peripheral pixel values, and subtracting a predetermined offset value. In the present embodiment, image information output from the sensor signal processing unit 103 is referred to as a RAW image or RAW data that means a raw (undeveloped) image.

Figure 2C:
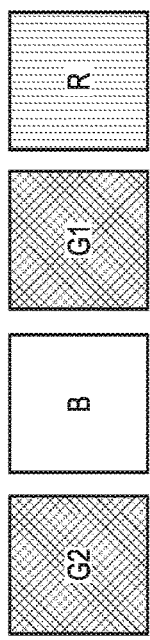
Figure 2A:
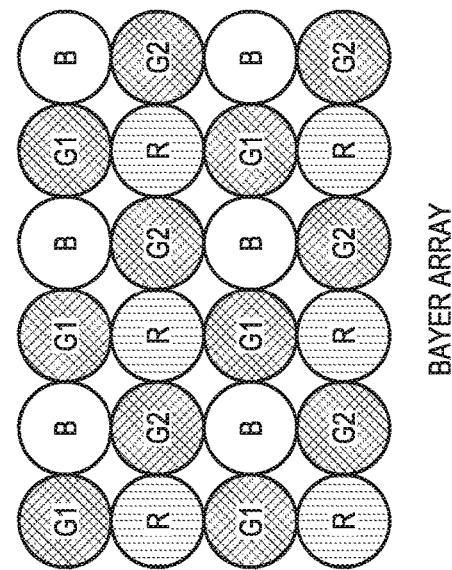

Thereafter, the RAW image that has been input in the Bayer array as in FIG. 2B, and processed is separated into pixels as in FIG. 2C, and is output to an input image buffer 104 so as to form planes with pixels having the respective components. However, because the Bayer array includes two pixels having G components, such G components of the two pixels are handled as different components, and respectively referred to as G1 and G2. The input image buffer 104 can input RAW images of a plurality of pixel lines. When the RAW images are input, an image coding unit 116 inputs the RAW images held by the input image buffer 104, and starts coding processing. The data that is input to the image coding unit 116 is referred to as image data herein.

A frequency transformation unit 105 inputs the RAW images held by the input image buffer 104, performs discrete wavelet transformation, transforms the image to sub-bands that are frequency bands, and outputs the transformed sub-bands to a quantization unit 106. The output of the frequency transformation unit 105 is a discrete wavelet transformation coefficient for each sub-band (hereinafter, also referred to as a transformation coefficient). A quantization setting unit 110 notifies the quantization unit 106 of a quantization step that the control unit 109 has given the instruction to perform. The quantization unit 106 uses the quantization step of which the quantization setting unit 110 notifies to quantize the transformation coefficient that has been input by the frequency transformation unit 105, and outputs this transformation coefficient to a coding unit 107. The coding unit 107 compresses and codes the transformation coefficient that has been quantized in the quantization unit 106 using entropy coding or the like, for example, and outputs the coded data to an coded data holding unit 108. In this embodiment, it is assumed that the coding unit 107 performs compression coding using entropy coding such as Golomb coding. Then, the coding unit 107 outputs a generated code amount of a coded stream that has been compressed and coded to a coded stream formation unit 112 and an overflow determination unit 113.

A maximum code amount setting unit 111 calculates the maximum code amount that is allocated to one picture, in accordance with a compression ratio that is determined based on various recording modes such as a recording mode in which image quality has the priority, a recording mode in which a recording time has the priority, and the like, of which the control unit 109 has instructed the maximum code amount setting unit 111, and gives an instruction to the overflow control unit 113. Alternatively, the maximum code amount setting unit 111 may store the maximum code amount set by the control unit 109 and give an instruction to the overflow control unit 113. After all sub-bands are coded by the coding unit 107, the overflow control unit 113 integrates the generated code amounts of all the sub-bands, and determines whether or not the integrated code amount exceeds the maximum code amount of which the maximum code amount setting unit 111 has notified the overflow control unit 113. If it is determined that the integrated code amount exceeds the maximum code amount, the overflow control unit 113 determines a sub-band that is to be replaced with copy data having a small code amount. Then, the control unit 113 notifies a copy data generation unit 114 and the coded stream formation unit 112 of the sub-band that is to be replaced with copy data, and receives a code amount of the sub-band that has been replaced with the copy data from the copy data generation unit 114. In this manner, the overflow control unit 113 performs code amount control for controlling the code amounts.

The copy data generation unit 114 generates data (hereinafter, referred to as copy data) that is coded with a coding method similar to the coding method of the coding unit 107 using all coefficients as 0 data with regard to the notified sub-band and outputs the generated data to the copy data holding unit 115. The coded stream formation unit 112 forms a coded stream by the copy data holding unit 115 inputting data of a target sub-band that is to be replaced with the copy data, and by the coded data holding unit 108 inputting data of sub-bands other than the target sub-band, in accordance with the instruction from the overflow control unit 113.

Structure of Coded Stream

Figure 3:
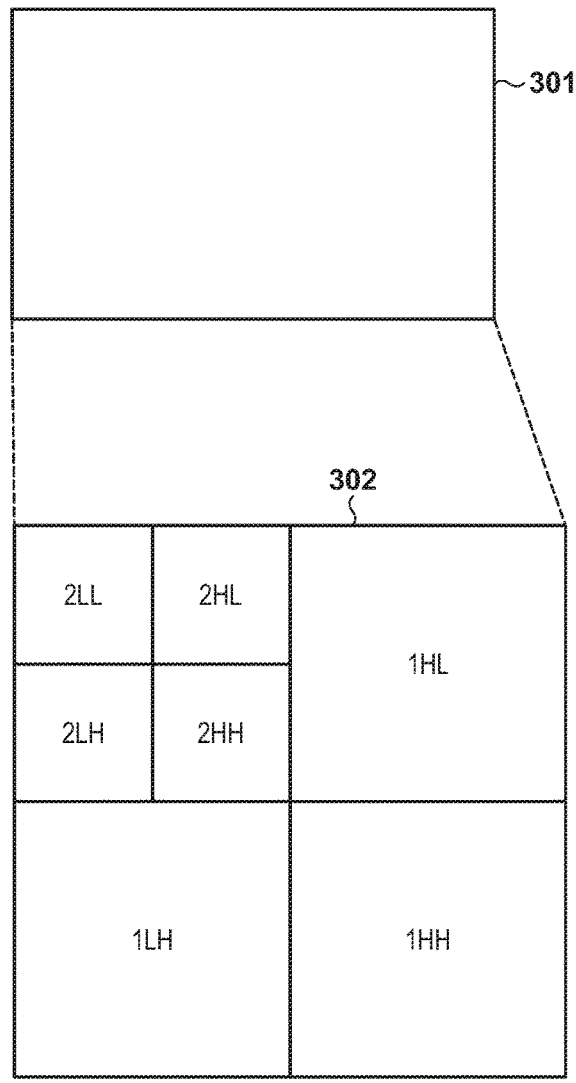
FIG. 3 is a conceptual diagram showing sub-bands in the first embodiment.

FIG. 3 is a conceptual diagram showing sub-bands when discrete wavelet transformation (DWT) is performed, with the upper left sub-band having the lowest frequency (that is, the frequency band is low), and the frequency of the sub-bands increasing (that is, the frequency band becomes higher) to the lower right. Here, the case is shown where two instances of horizontal and vertical DWT are performed on a sub-band LL that has low frequency components horizontally and vertically, and there are sub-bands up to a resolving level (Lv) 2. In FIG. 3, an input image 301 is resolved into a sub-band 302 by wavelet transformation. 2LL, 2HL, 2LH, and 2HH of the sub-band 302 are sub-bands having a sub-band resolving Lv of 2. Similarly, 1HL, 1LH, and 1HH are sub-bands having a sub-band resolving Lv of 1. Note that, for convenience, the original image is regarded as 0LL having a low frequency component at a resolving level 0. Note that although there can be higher resolving levels in JPEG 2000, the invention according to the present embodiment can be implemented regardless of the number of resolving levels, and thus this example is confined to resolving levels up to level 2.

If one picture is coded, seven sub-bands are generated for four pixel planes, namely, a R1 pixel plane, a B1 pixel plane, a G1 pixel plane, and a G2 pixel plane of Bayer pixels, and thus 28 sub-bands are generated in total. Note that although one picture (overall input image) is to be coded in this example, the input image may be divided into tiles and then coded using each tile as the unit. Of course, the invention according to the present embodiment can also be applied thereto.

Figure 4:
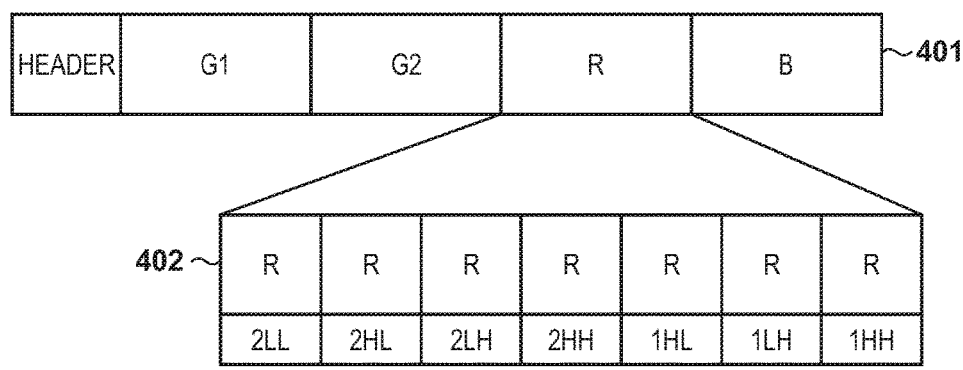
FIG. 4 is a conceptual diagram showing a structure of a coded stream in one frame in the first embodiment.

FIG. 4 is a conceptual diagram showing the structure of a coded stream of one frame that is formed by the coded stream formation unit 112. Here, similarly to FIG. 3, the case is shown where two instances of horizontal and vertical DWT are performed, and there are sub-bands up to a resolving Lv 2. A coded stream 401 includes pixel planes having color components. Coded data 402 is coded data of sub-bands included in the R pixel plane, and includes sub-bands at all levels. The coded stream formation unit 112 outputs a coded stream after a header including information required for decoding is added to its head, such that pixel planes for each color component are arranged in order as one group. The seven sub-bands in the pixel plane are arranged in order from low frequency.

Overflow Control Processing

Figure 5:
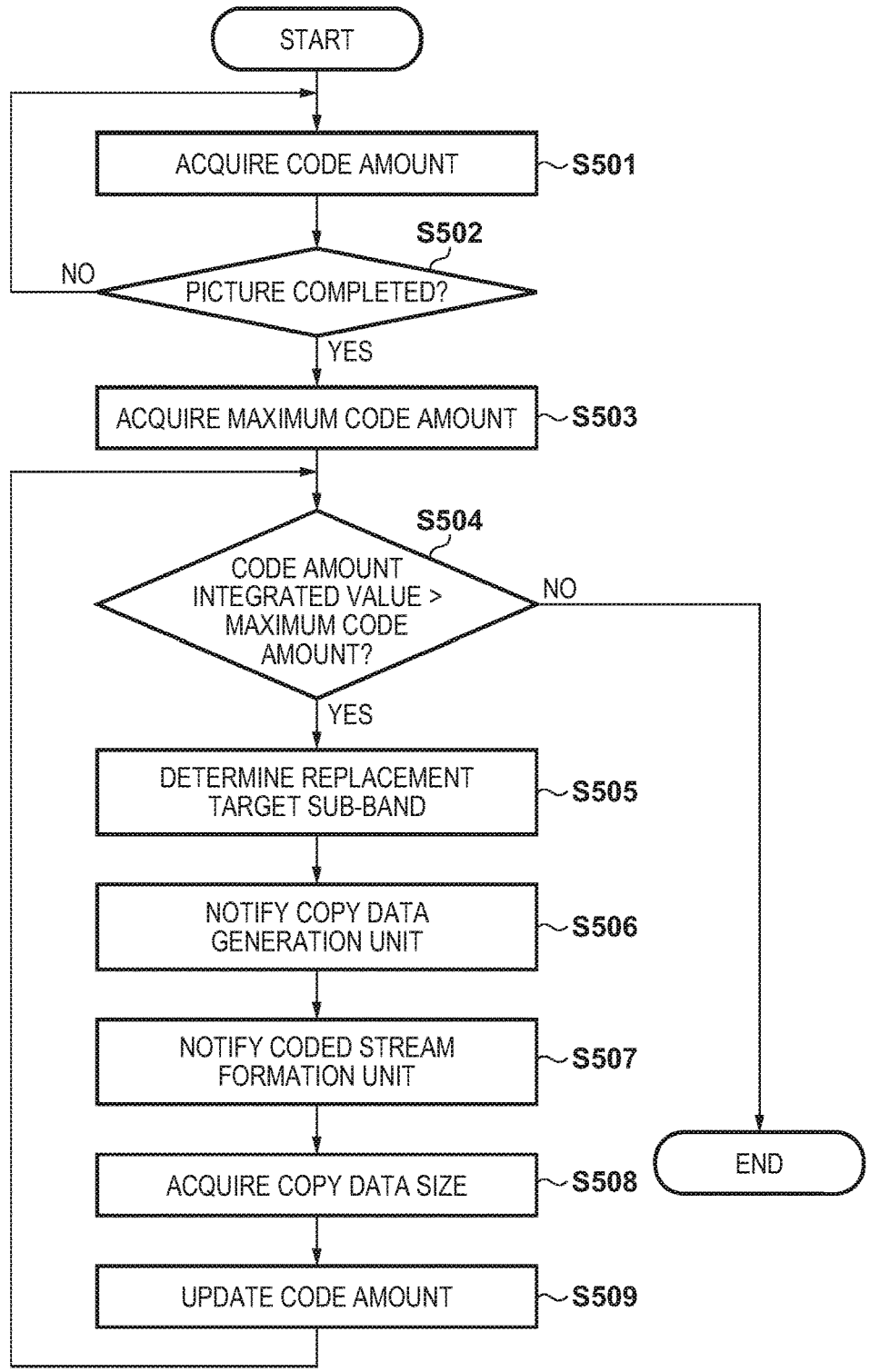
FIG. 5 is a flowchart showing processing of an overflow control unit of the first embodiment.

FIG. 5 is a flowchart showing processing of the overflow control unit 113. The processing content of overflow control is shown using FIG. 5. Note that the overflow control unit 113 can also be realized by a computer (processor) executing a program.

The generated code amounts in units of the sub-bands are acquired from the coding unit 107 in step S501.

It is determined in step S502 whether or not generated code amounts of all sub-bands included in the picture are acquired, and the processing branches based on the determination result. If the generated code amounts of all the sub-bands have been acquired, the processing advances to step S503, and if they have not, the processing advances to step S501 in order to acquire generated code amounts of the other sub-bands.

In step S503, a maximum generated code amount that is a threshold value is acquired from the maximum coding amount setting unit 111.

It is determined in step S504 whether or not a value obtained by integrating generated code amounts of all the sub-bands included in the picture, that is, a total code amount is larger than the maximum generated code amount acquired in step S503, and the processing branches based on the determination result. If it is determined that the value obtained by integrating the generated code amounts is larger than the maximum generated code amount, the processing advances to step S505, whereas if it is determined that it is not larger than the maximum generated code amount, the processing ends. That is, the loop of steps S504 to S509 is executed until the total code amount is less than or equal to the threshold value.

In step S505, a sub-band having a low priority among sub-bands that are not to be replaced is regarded as a replacement target sub-band. Determination processing will be described in detail later.

In step S506, the copy data generation unit 114 is notified of generation of copy data of the replacement target sub-band that has been determined in step S505.

In step S507, the coded stream generation unit 112 is notified of the replacement target sub-band.

In step S508, the size of copy data is acquired from the copy data generation unit 114. In step S509, the code amount of the replacement target sub-band is updated with the size of the copy data.

Replacement Target Sub-Band Determination Processing

Figure 6:
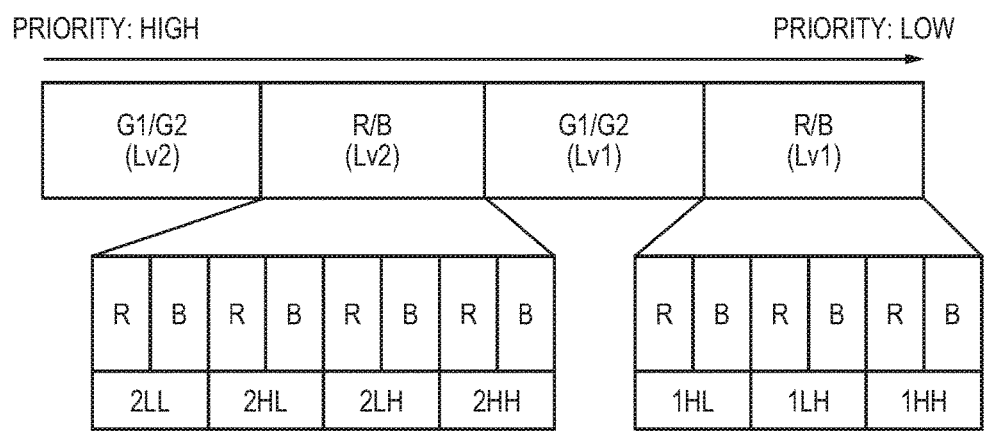
FIG. 6 is a diagram showing the priorities of sub-bands in the first embodiment.

Here, processing for determining the replacement target sub-band in step S505 will be described. The overflow control unit 113 gives the priorities to the sub-bands, and regards a sub-band having a lower priority as a copy data replacement target. FIG. 6 is a diagram showing the priorities of the sub-bands in the overflow control unit of the present embodiment. The priorities of the sub-bands are ordered uniquely, and the priorities are ordered based on the resolving levels (Lv) of the sub-bands and pixel planes. With regard to the sub-band resolving Lv, a sub-band having a higher resolving Lv has a higher priority. The priorities in the same resolving Lv differ in accordance with the pixel plane, and the G1/G2 component is higher and the R/B component is lower. The priorities also differ in accordance with the component of the sub-bands in the pixel planes, and the priorities are given in order of LL as the highest (Lv 2 only), and then HL, LH, and HH. In the example of FIG. 6, the sub-band 1HH of the B component has the lowest priority, and the sub-band 2LL of the G1 component has the highest priority. Note that although the sub-band LH has a lower priority than the sub-band HL in the same pixel plane and at the same resolving level in the example of FIG. 6, the order may be opposite thereto. Also, the priorities may be determined in advance and defined in a fixed manner, or may be defined in a programmable manner. The overflow control unit 113 executes the procedures of FIG. 5 in accordance with the defined priorities.

Figure 7:
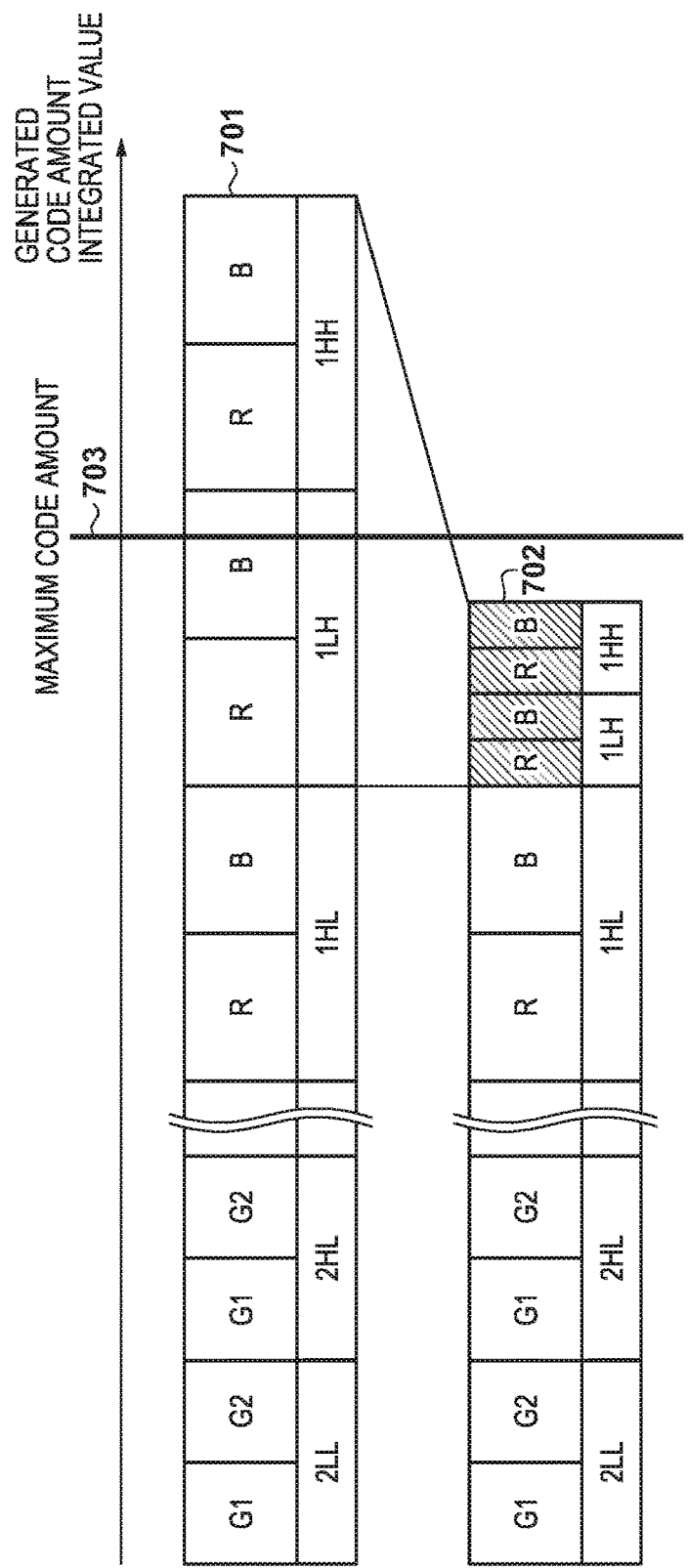
FIG. 7 is a conceptual diagram showing a value obtained by integrating code amounts in the first embodiment.

FIG. 7 is a diagram showing the value obtained by integrating generated code amounts before replacement processing and a value obtained by integrating generated code amounts after the replacement, in the case where the value obtained by integrating generated code amounts of the sub-bands exceeds the set maximum generated code amount. Reference numeral 701 indicates a generated code amount of a coded stream before replacement processing. Reference numeral 702 indicates a generated code amount of a coded stream after the replacement processing. Reference numeral 703 indicates the maximum code amount that the maximum code amount control unit 111 notifies. Here, the integrated value of code amounts is suppressed to the maximum generated code amount or less by replacing four sub-bands of the LH component and the HH component, which are respectively included in the R pixel plane and the B pixel plane, at a resolving Lv 1 with copy data, in accordance with the priorities of the sub-bands shown in FIG. 6. The replacement with the copy data is performed in order from the sub-band having the lowest priority shown in FIG. 6 in accordance with the procedures in FIG. 5 until step S504 is satisfied. FIG. 7 shows that the 1HH sub-band of the B component having the lowest priority is first replaced with copy data, the 1HH sub-band of the R component, the 1LH sub-band of the B component, and the 1LH sub-band of the R component are sequentially replaced with copy data, and the code amount integrated value reaches the maximum code amount or less at this point.

Figure 8:
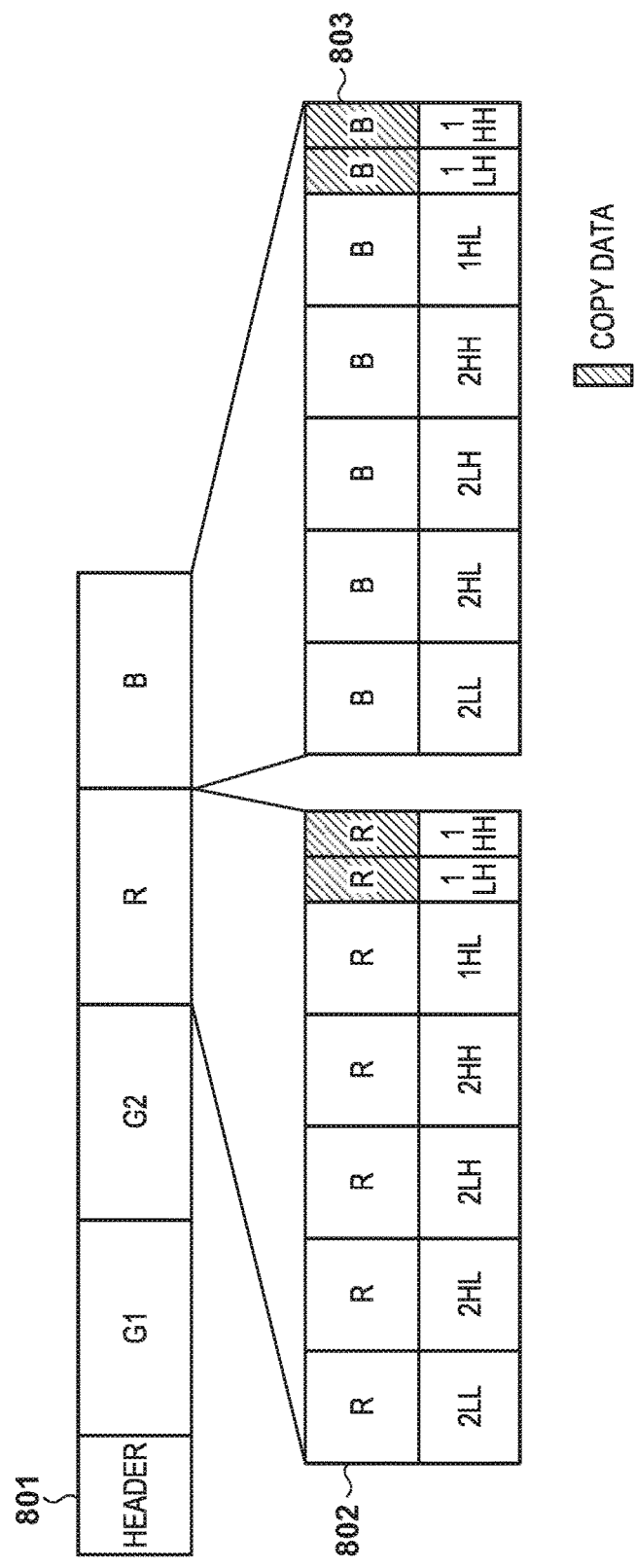
FIG. 8 is a conceptual diagram showing a data structure of a coded stream including copy data in the first embodiment.

FIG. 8 is a conceptual diagram showing the data structure of a coded stream including copy data. The processing of the coded stream formation unit 112 if a copy data replacement instruction is given is shown using FIG. 8. Similarly to FIG. 7, here, it is assumed that four sub-bands in total of the LH component and the HH component at the resolving Lv 1 that are included in the R pixel plane and the B pixel plane are replaced with copy data. A coded stream 801 includes pixel planes having color components. In coded data 802 of the sub-bands that are included in the R pixel plane, the sub-bands of the LH component and the HH component at the resolving level 1 are replaced with copy data. In coded data 803 of the sub-bands that are included in the B pixel plane, the sub-bands of the LH component and the HH component at the resolving level 1 are also replaced with copy data.

The coded stream formation unit 112 inputs, using the copy data holding unit 115, sub-bands of the LH component and the HH component at a resolving Lv 1 that are included in the R pixel plane and the B pixel plane in accordance with information indicating replacement target sub-band of which the overflow control unit 113 notifies the coded stream formation unit 112, and inputs the other sub-bands using the coded data holding unit 108. Then, the coded data of the sub-band is replaced with the corresponding copy data in accordance with the information showing the replacement target sub-band. In this example, the copy data is coded data obtained by coded data in which wavelet transformation coefficients of sub-bands that are to be replaced are all set to 0, and the sub-bands are replaced with this data. Such a coded stream is coded data that is generated using normal discrete wavelet transformation, and thus a unique decoder is not required, and such a coded stream can be reproduced with a general decoder. Also, since a sub-band having a lower priority (a sub-band having a higher frequency in this example) is replaced first, deterioration of image quality can be suppressed to a minimum.

Doing so makes it possible to provide an image capturing apparatus that can suppress deterioration of image quality to a minimum and adjust code amounts after all sub-bands included in a picture are coded.

Second Embodiment

The present embodiment is different from the configuration of the first embodiment in that a copy data generation unit 114 and a copy data holding unit 115 are omitted, and an overflow control unit 113 gives an instruction to discard data to the coded stream formation unit 112, and the coded stream formation unit 112 generates a coded stream in accordance with the data discard instruction. The other blocks have similar configurations to the first embodiment.

Figure 9:
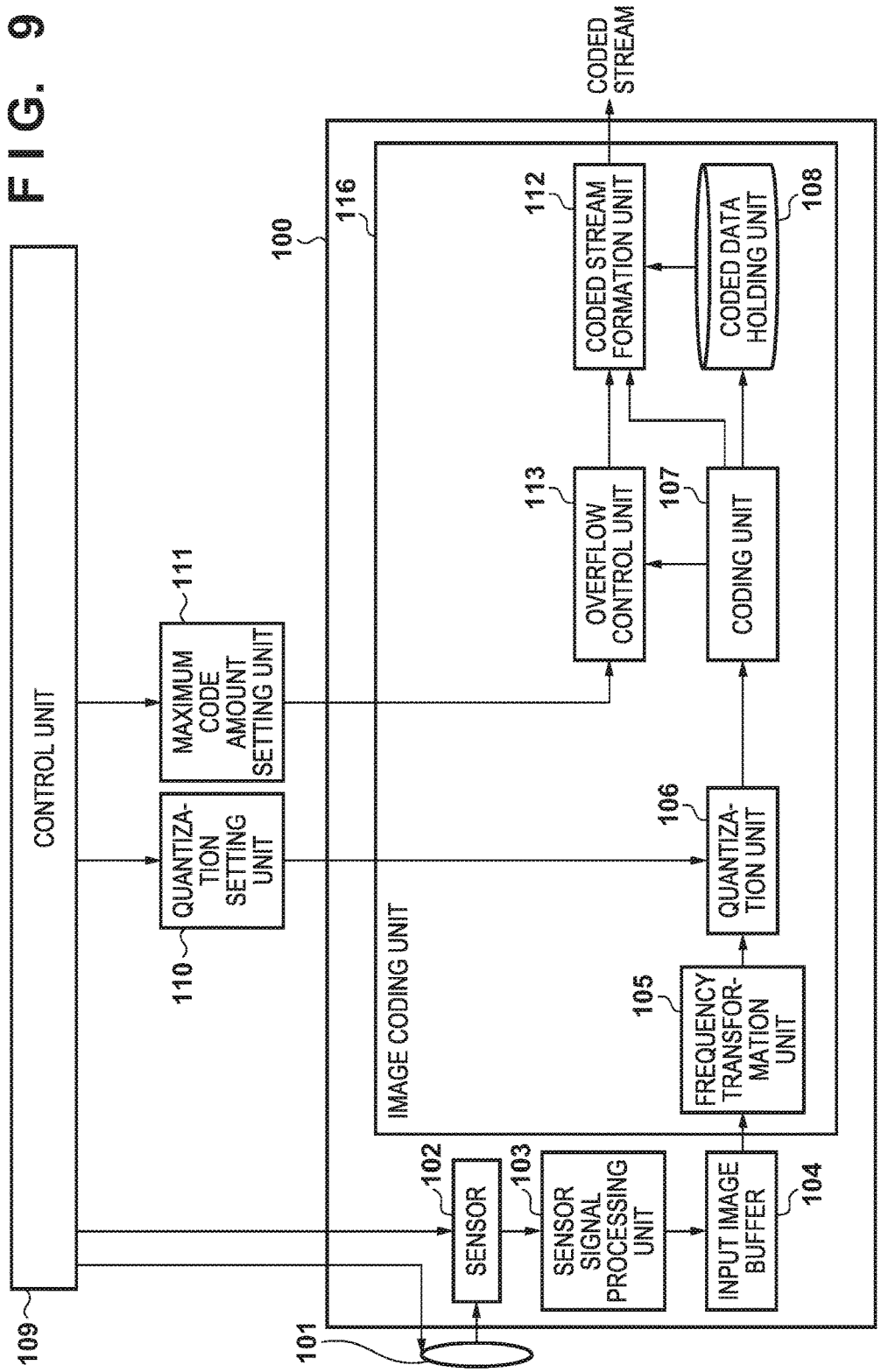
FIG. 9 is a block diagram showing a configuration example of an image capturing apparatus according to a second embodiment.

FIG. 9 is a block diagram showing a configuration example of an image capturing apparatus according to the present embodiment. The overflow control unit 113 integrates the generated code amounts of all the sub-bands acquired from a coding unit 107 after all the sub-bands are coded by the coding unit 107, determines whether or not the integrated generated code amount exceeds the maximum code amount of which a maximum coding amount setting unit 111 has notified the overflow control unit 113, and if it is determined that it exceeds the maximum code amount, determines a sub-band whose data is discarded. Then, the overflow control unit 113 notifies the coded stream formation unit 112 of a data discard target sub-band. Upon receiving a data discard notification, the coded stream formation unit 112 attaches a flag indicating that data is discarded to the header.

Header Structure and Replacement Instruction

Figure 10A:
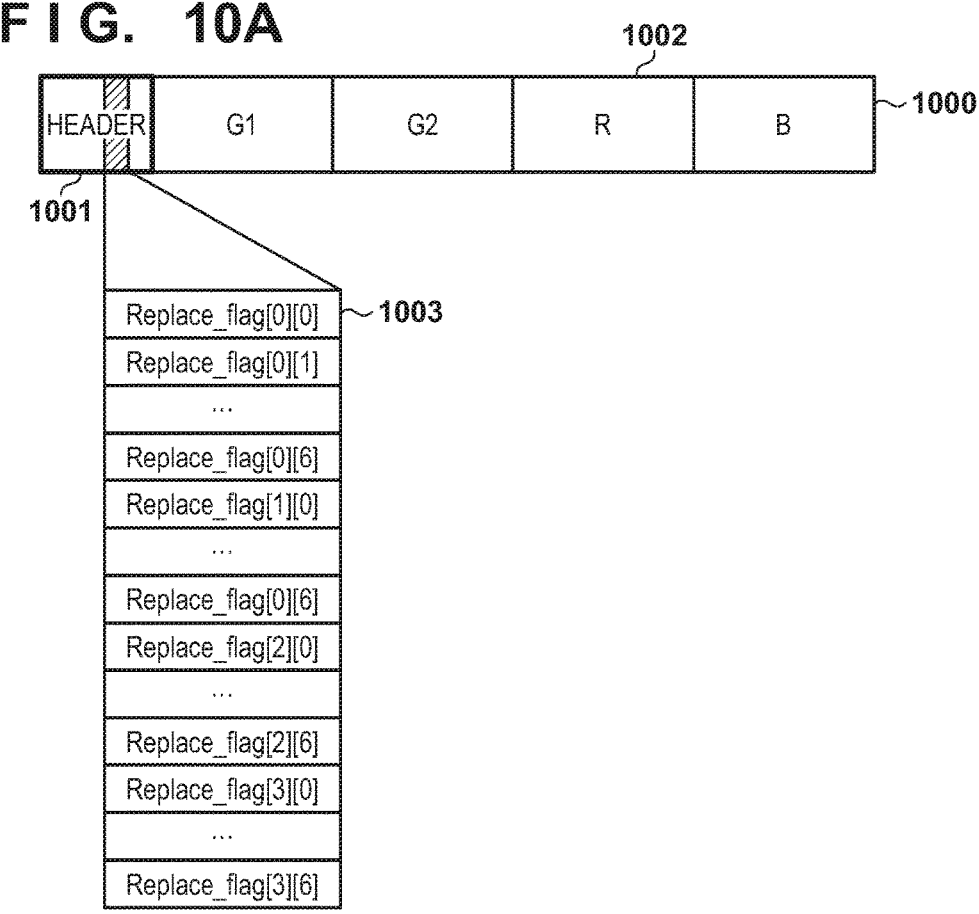
FIG. 10A is a conceptual diagram showing a structure of a coded stream in a second embodiment and parameters relating to a replacement instruction.

FIG. 10A is a conceptual diagram showing a structure of a coded stream in this embodiment, and parameters relating to a replacement instruction. A coded stream 1000 includes a header 1001 and a coded data 1002. Replace_flag (replacement flag) 1003 indicates a flag showing data discard, and there are flags for all sub-bands. Replace_flag 1003 is included in the header 1001. The coded stream formation unit 112 first sets Replace_flag of all the sub-bands to 0. Then, upon receiving a data discard instruction together with a sub-band designation from the overflow control unit 113, the coded stream formation unit 112 sets Replace_flag corresponding to the sub-band about which the data discard instruction is given to 1. After setting all Replace_flags corresponding to the sub-bands whose data is to be discarded to 1, the coded stream formation unit 112 inputs data of the sub-bands that are not to be discarded using the coded data holding unit 108, and forms a coded stream with only sub-bands that are not to be discarded. Also, the header 1000 includes the Replace_flags 1003 that have been set as described above.

Figure 10B:
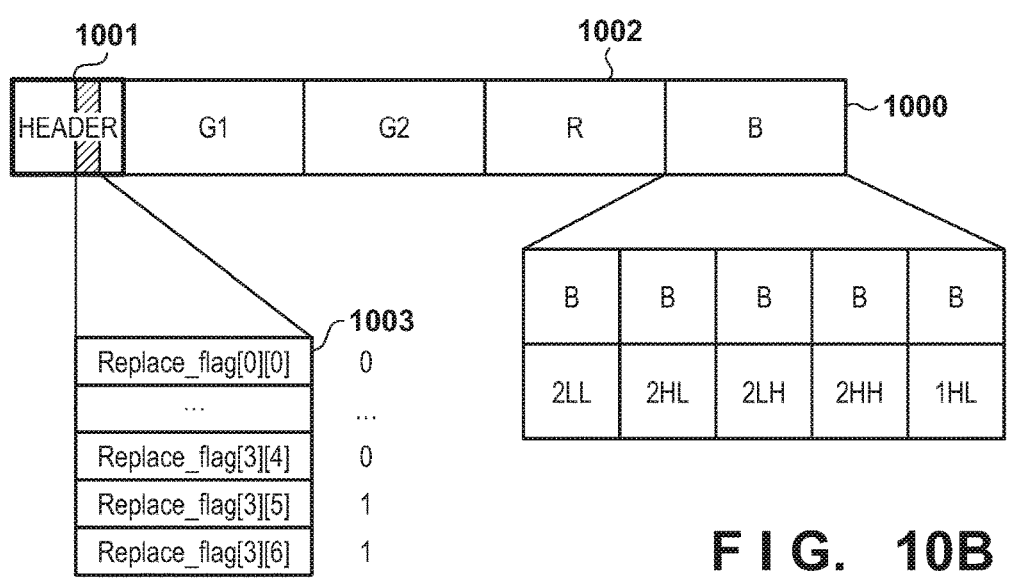
FIG. 10B is a conceptual diagram showing a structure of a coded stream in the second embodiment.

FIG. 10B shows a data structure of a coded stream. Here, the case will be described as an example in which an instruction is received that indicates that sub-bands of the LH component and the HH component at resolving Lv 1 that are included in the B pixel plane are the data discard target. Only the Replace_flags 1003 that correspond to the sub-bands of the LH component and the HH component at a resolving Lv 1 that are included in the B pixel plane become 1, and the others are 0. The coded data of the sub-bands of the LH component and the HH component at a resolving Lv 1 that are included in the B pixel plane include sub-bands that are the data discard target, and thus are not included in the coded data 1002. A method for reproducing such a coded stream will be described in detail later. Although Replace_flags 1003 may be set in association with identification information indicating sub-bands, the order of sub-bands may be determined in advance and only the values of flags may be set in accordance with that order.

Method for Reproducing Coded Stream

FIG. 11 is a block diagram showing a configuration example of a reproduction device that can reproduce a coded stream generated by the coding device in FIG. 9. Coded data 1101 of the sub-band is input to a decoding processing unit 1102 that inputs coded data and performs decoding processing. A dequantization processing unit 1103 inputs a coefficient decoded by the decoding processing unit 1102 and performs dequantization processing (or inverse quantization processing). A discrete wavelet synthesis processing unit 1104 inputs an inversely quantized coefficient for each sub-band using the dequantization processing unit 1103, performs inverse wavelet transformation on coefficient data that has been input, and forms a pixel plane. Also, 0 data 1105 obtained by replacing all quantized coefficients of sub-bands with 0 is input to the discrete wavelet synthesis processing unit 1104. This replacement flag (Replace_flag) look up and control of decoding corresponding to that value may be performed by an input control unit (not shown) of a reproduction device, for example. The input control unit looks up the Replace_flags 1003 of the header 1001, and with regard to the sub-bands whose Replace_flag is 0, inputs the coded data 1101 of that sub-band to the decoding processing unit 1102 so as to decode the data, and inputs a coefficient that has been subjected to the dequantization processing to the discrete wavelet synthesis processing unit 1104 using the dequantization processing unit 1103. On the other hand, with regard to the sub-bands whose Replace_flag is 1, coded data of that sub-bands have been discarded at the time of recording, and thus are not present. Therefore, the input control unit inputs the 0 data 1105 to the discrete wavelet synthesis processing unit 1104, instead of subjecting the coded data of the sub-bands to decoding processing and dequantization processing. The function of this input control unit may be executed by the discrete wavelet synthesis processing unit 1104.

Even with regard to a coded stream in which coded data of sub-bands are not present, the discrete wavelet synthesis processing unit 1104 can execute processing for reproducing an image using 0 data as the input, by using the Replace_flag. Also, even if data of a plurality of sub-bands have been discarded, it can be easily judged whether or not coded data is present using the Replace_flags.

Doing so makes it possible to provide an image capturing apparatus that can adjust code amounts after all sub-bands included in a picture are coded, without copy data generation processing, although a reproduction device for performing reproduction using the Replace_flag will be required.

Also, although the case where reproduction is performed using the Replace_flags has been described in the present embodiment, a configuration in which the header 1001 includes Syntax (subband_size) indicating a code length of a sub-band, and upon receiving a data discard instruction together with a sub-band designation from the overflow control unit 113, the coded stream formation unit 112 sets the coded stream by setting the subband_size to 0, without using the Replace_flag, and a configuration in which, with regard to a sub-band whose subband_size is 0, the reproduction device executes processing for reproducing an image using 0 data as the input, similarly to the case where reproduction is performed using the Replace_flag, are also within the scope of the invention of the present embodiment.

Third Embodiment

In contrast to the configuration of the first embodiment, the present embodiment has a configuration in which a sensor signal processing unit 103 performs component transformation on a Bayer array to obtain four planes, namely, a luminance component Y, color components U and V, and GH that is a high frequency component of G, and outputs them to an input image buffer, and the other blocks have similar configurations to those of the first embodiment.

Figure 12A:
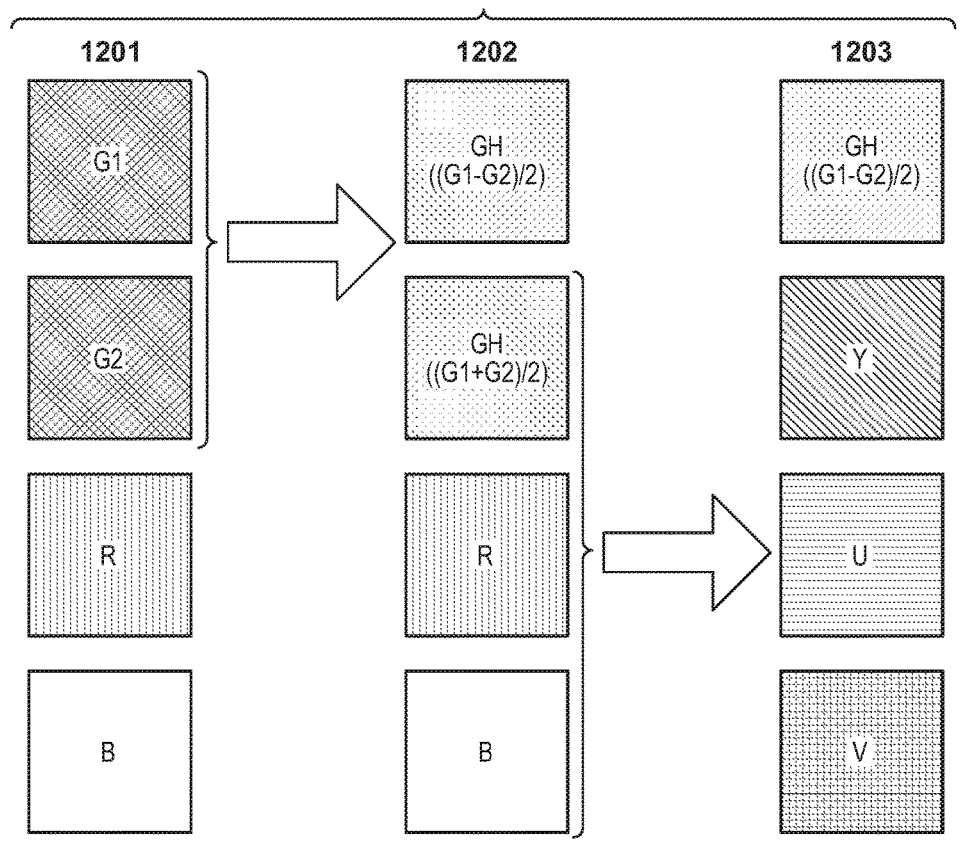
FIG. 12A is a conceptual diagram showing a process of component transformation in a sensor signal processing unit in a third embodiment.

FIG. 12A is a diagram showing a process of component transformation of the sensor signal processing unit 103 in the present embodiment. A pixel group 1201 include pixels G1, G2, R, and B pixels that are included in the Bayer array. A pixel group 1202 includes GH, GL, R, and B pixels obtained by transforming the G1 and G2 pixels to the GH and GL components. A pixel group 1203 includes GH, Y, U, and V pixels obtained by subjecting GL, R, and B images to YUV transformation. Here, for example, the Y component is a luminance component, the U component is a component of a color difference between Y and R, and the V component is a component of a color difference between Y and B. The sensor signal processing unit 103 uses a correlation between G1 and G2 of the G1, G2, R, and B pixels 1201 of the RAW image that has been input in the Bayer array as shown in FIG. 2B and has been processed to transform G1 and G2 to GH that is a high frequency component of G and GL that are low frequency components thereof, generating the GH, GL, R, and B pixels 1202. Note that in the present example, GH and GL are respectively given by $GH=(G1-G2)/2$ and $GL=(G1+G2)/2$.

Next, the GH, Y, U, and V pixels 1203 are generated by subjecting GL that is a low frequency component of G, R, and B of the GH, GL, R, and B pixels 1202 to color space conversion to obtain Y, U, and V components. The sensor signal processing unit 103 outputs the GH, Y, U, and V pixels 1203 to the input image buffer 104 so as to form planes with these pixels.

Figure 12B:
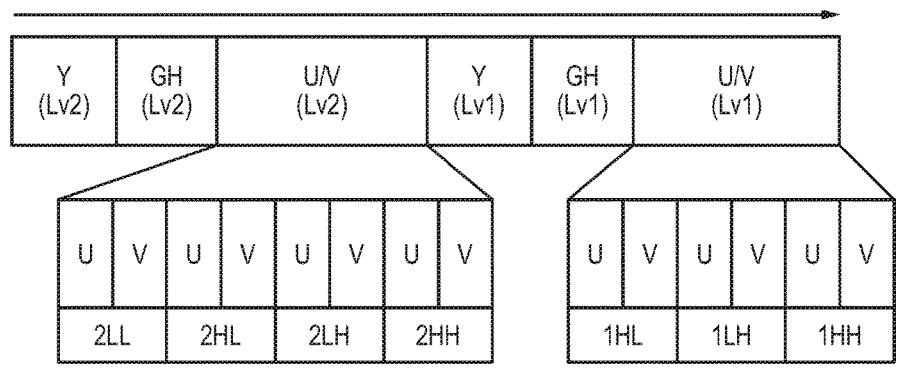
FIG. 12B is a diagram showing the priorities of sub-bands in the third embodiment.

FIG. 12B is a diagram showing the priority of sub-bands in the present embodiment. Similarly to the first embodiment, the priorities of sub-bands are ordered uniquely, and the priority is given in order of the sub-band resolving Lv and the pixel plane. With regard to the sub-band resolving Lv, a sub-band having a higher resolving Lv has a higher priority. The priorities in the same resolving Lv differ in accordance with the pixel plane, and the priorities are given in order of the Y component as the highest, and then the GH component and the R/B components. Also, similarly to the first embodiment, the priorities also differ in accordance with the component of the sub-bands in the pixel planes, and the priorities are given in order of LL as the highest (the highest level only, Lv 2 only in FIG. 12B), and then HL, LH, and HH. It is possible to perform replacement on the sub-band having a lower priority first, even in the case where the Bayer array is subjected to component conversion to obtain a YUV-system color space. Except for the point at which the color system changes as in FIG. 12A, an image can be coded with a configuration similar to in FIG. 1. Thus, an image can be reproduced from the coded stream with a general decoding device.

Doing so makes it possible to provide an image capturing apparatus that can adjust the code amount while suppressing deterioration of image quality to a minimum after all sub-bands included in a picture are coded, even in the case where the Bayer array has been subjected to component conversion to obtain the YUV system color space.

Also, although the case where the sensor signal processing unit 103 performs component conversion on the configuration of the first embodiment has been described in the present embodiment, the configuration in which the sensor signal processing unit 103 performs component conversion on the configuration of the second embodiment is also within the scope of the invention of the present embodiment.

Note that discarding of coded data per sub-band that has been described in the second embodiment can also be applied to the present embodiment.

Fourth Embodiment

The present embodiment differs from the configuration of the first embodiment in that the priorities for sub-bands are provided to groups of sub-bands instead of uniquely providing the priorities to sub-bands. Although the configuration of the image capturing apparatus of the present embodiment is the same as in the first embodiment, the operations of the overflow control unit 113 are different from in the first embodiment. Also, similarly to the first embodiment, the operations of the reproduction device are the same as those of a normal reproduction device. The overflow control unit 113 is configured to select a copy data replacement target sub-band from a group of sub-bands that have the same priority, and the coded stream formation unit 112 is configured to generate a coded stream such that copy data are collectively disposed at the back thereof. The other blocks have similar configurations to the first embodiment.

Priority of Sub-Band

Figure 13:
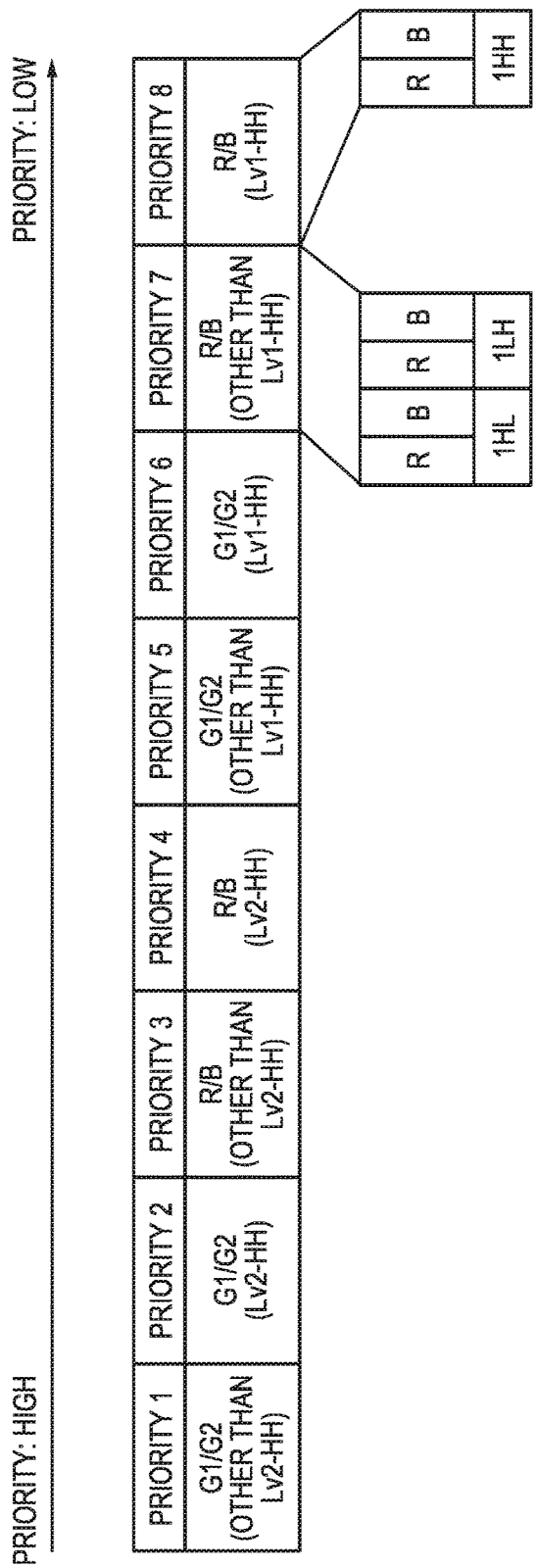
FIG. 13 is a diagram showing the priorities of sub-bands in a fourth embodiment.

The overflow control unit 103 gives the priorities to the sub-bands, and replaces sub-bands having lower priorities in order with copy data until the data amount after coding reaches a predetermined value or less. FIG. 13 is a conceptual diagram showing the priority of sub-bands in the present embodiment. LL, LH, and HL components of sub-bands of G1 and G2 at the resolving Lv 2 are regarded as a group having the same priority 1, which is the highest priority, an HH component of sub-bands of G1 and G2 at the resolving Lv 2 is regarded as a group having the same priority 2, which is the next highest priority, LL, LH, and HL components of sub-bands of R and B at a resolving Lv 2 are regarded as a group having the same priority 3, which is the next highest priority, and an HH component of sub-bands of R and B at the resolving Lv 2 is regarded as a group having the same priority 4, which is the next highest priority. LH and HL components of sub-bands of G1 and G2 at a resolving Lv 1 are regarded as a group having the same priority 5, which is the next highest priority, an HH component of sub-bands of G1 and G2 at the resolving Lv 1 is regarded as a group having the same priority 6, which is the next highest priority, LH and HL components of sub-bands of R and B at the resolving Lv 1 are regarded as a group having the same priority 7, which is the next highest priority, and an HH component of sub-bands of R and B at the resolving Lv 1 are regarded as a group having the same priority 8, which is the next highest priority. In this example, the sub-bands are classified into eight priorities in total.

In FIG. 13, the group of sub-bands LL, LH, and HL of G1 and G2 at the resolving Lv 2 has the highest priority, and the group having the priority for the group of the sub-band HH of R and B at the resolving Lv 1 has the lowest priority. This prioritization of sub-bands may be determined in advance, or may be set to be modifiable, for example. Either way, the overflow control unit 113 can replace each sub-band with copy data in accordance with its priority.

Overflow Control

Figure 14:
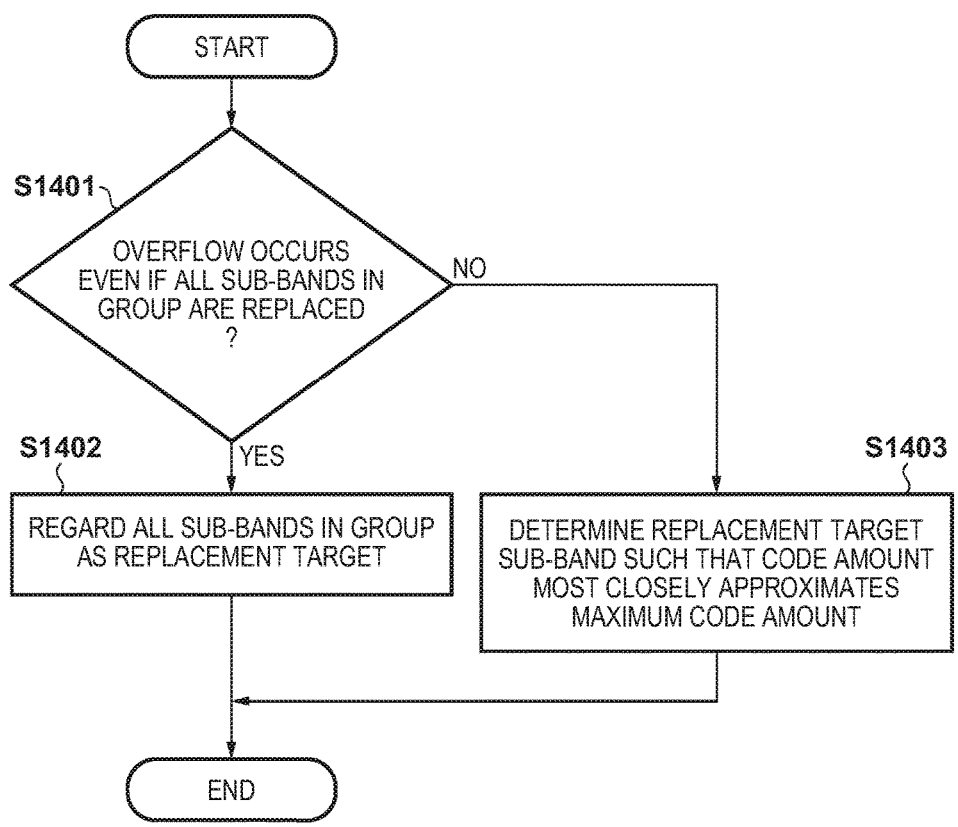
FIG. 14 is a flowchart of an overflow control unit in the fourth embodiment.

The overflow control unit 113 regards sub-bands having lower priorities as copy data replacement targets in order, based on the above-described priorities. FIG. 14 is a flowchart showing a method for determining a sub-band replacement target of the overflow control unit in the present embodiment. That is, the procedures in FIG. 14 are executed in the present embodiment in step S505 of FIG. 5. In steps S505 to S509, processing for one or more sub-bands that have been determined with the procedures in FIG. 14 is executed. In step S1401, even if all sub-bands included in a group having the lowest priority of sub-bands that are not copy data replacement targets are set to be replacement targets, the processing branches depending on whether or not their code amounts exceeds the maximum code amount of which the code amount control unit notifies. First, a group having the lowest priority is selected. If the code amounts exceed the maximum code amount, the processing advances to step S1402, and if not, the processing branches to step S1403.

In step S1402, all sub-bands included in a group having the lowest priority of sub-bands that are not the copy data replacement targets are regarded as the replacement target.

In step S1403, a replacement target sub-band is selected from sub-bands included in a group having the lowest priority (that is, a group that has been regarded as the copy data replacement target in step S1401) of sub-bands that are not the copy data replacement targets, such that the code amounts mostly approximate the maximum code amount that is notified by the maximum code amount setting unit 114. The selection method can be realized with a method of selecting a combination of all combinations that are possible, with which the code amounts mostly approximate the maximum code amount. For example, a difference between a code data amount before replacement with copy data and the maximum code amount is obtained. Then, with regard to the sub-bands belonging to a target group, a data reduction amount in the case where the sub-bands are replaced with copy data is obtained. A combination of sub-bands is determined by combining these data reduction amounts so as to achieve the minimum value of values that are larger than the difference between the code data amount before replacement and the maximum code amount. This sub-band serves as a replacement target sub-band.

Figure 15:
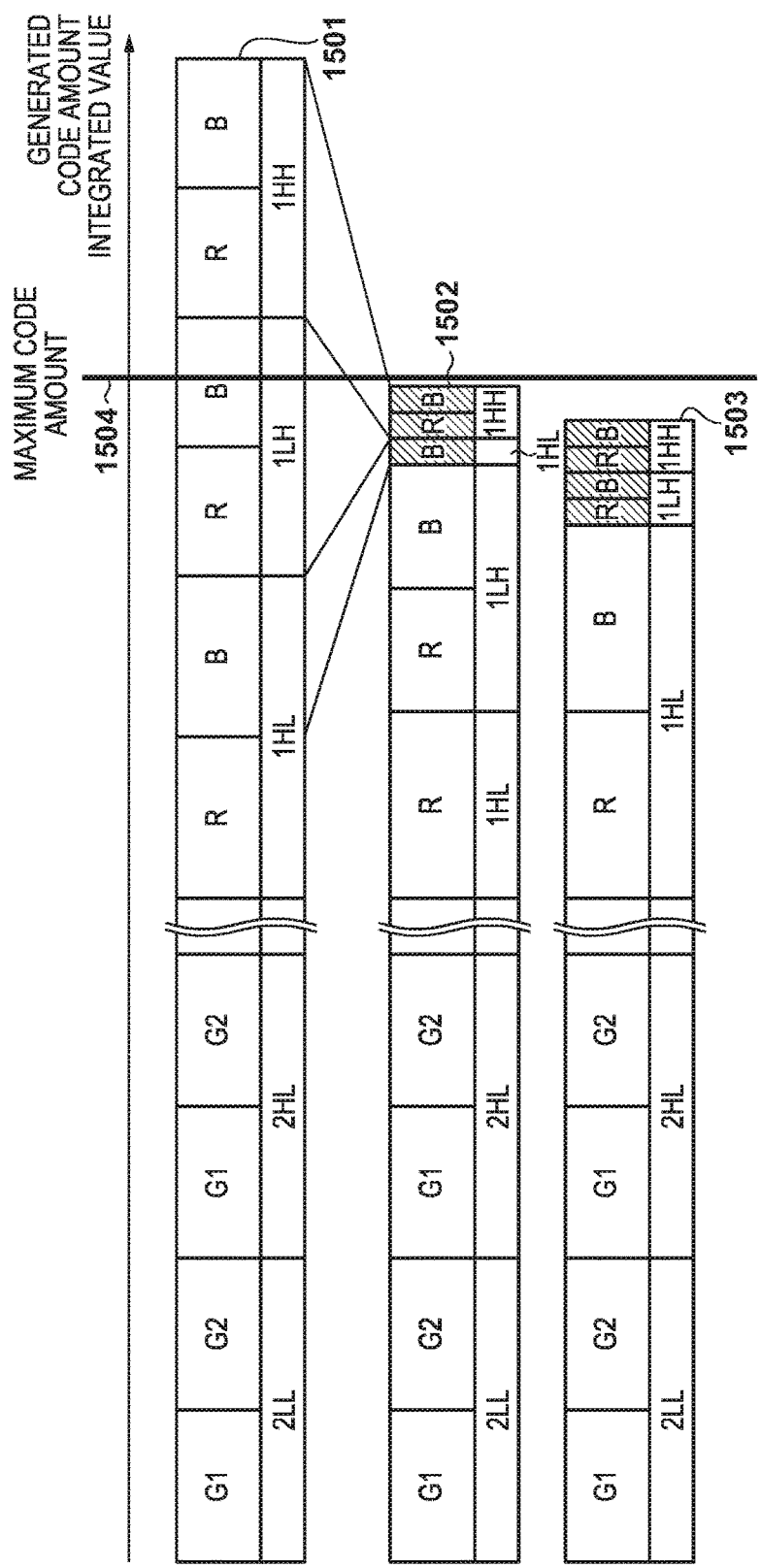
FIG. 15 is a conceptual diagram showing a value obtained by integrating code amounts of a coded stream in the fourth embodiment.

FIG. 15 is a conceptual diagram showing values obtained by integrating code amounts of a coded stream including copy data that is generated by the overflow control unit of the first embodiment and code amount of a coded stream that includes copy data in the present embodiment. Before copy data replacement, the code amounts of a coded stream 1501 exceeds a maximum code amount 1504 that is notified by the maximum coding amount setting unit 111. Due to copy data replacement in the present embodiment, the code amount of a coded stream 1502 after copy data replacement is larger than the code amount of coded stream 1503 after copy data replacement that is generated by the overflow control unit 113 of the first embodiment, and is less than or equal to the maximum code amount 1504.

Sub-bands of the LH component and the HH component of R at the resolving Lv 1, the LH component and the HH component of B at the resolving Lv 1, that is, four sub-bands in total are copy data replacement targets in the coded stream 1503 before copy data replacement that is generated by the coded stream formation unit 112 under the control of the overflow control unit 113 of the first embodiment. That is, sub-bands having lower priorities are replaced with copy data in order, and at a time point when the code amount is less than or equal to the maximum code amount 1504, the above-described four sub-bands become the replacement targets.

On the other hand, the sub-bands of the HH component of R at the resolving Lv 1 and the HL component and the HH component of the B pixel at the resolving Lv 1, that is, three sub-bands in total are the copy data replacement targets in the coded stream 1502 before copy data replacement that is generated by the coded stream formation unit 112 under the control of the overflow control unit 1503 of the present embodiment. That is, selecting an appropriate sub-band of sub-bands having the same priority as the replacement target makes it possible to make the selected sub-band a more appropriate sub-band.

The coded stream 1502 generated by the coded stream formation unit 112 based on the control of the overflow control unit 113 of the present embodiment has less sub-bands that are replaced with copy data, and thus the image quality increases compared to the coded stream 1503 generated based on the control of the overflow control unit 113 of the first embodiment.

Figure 16:
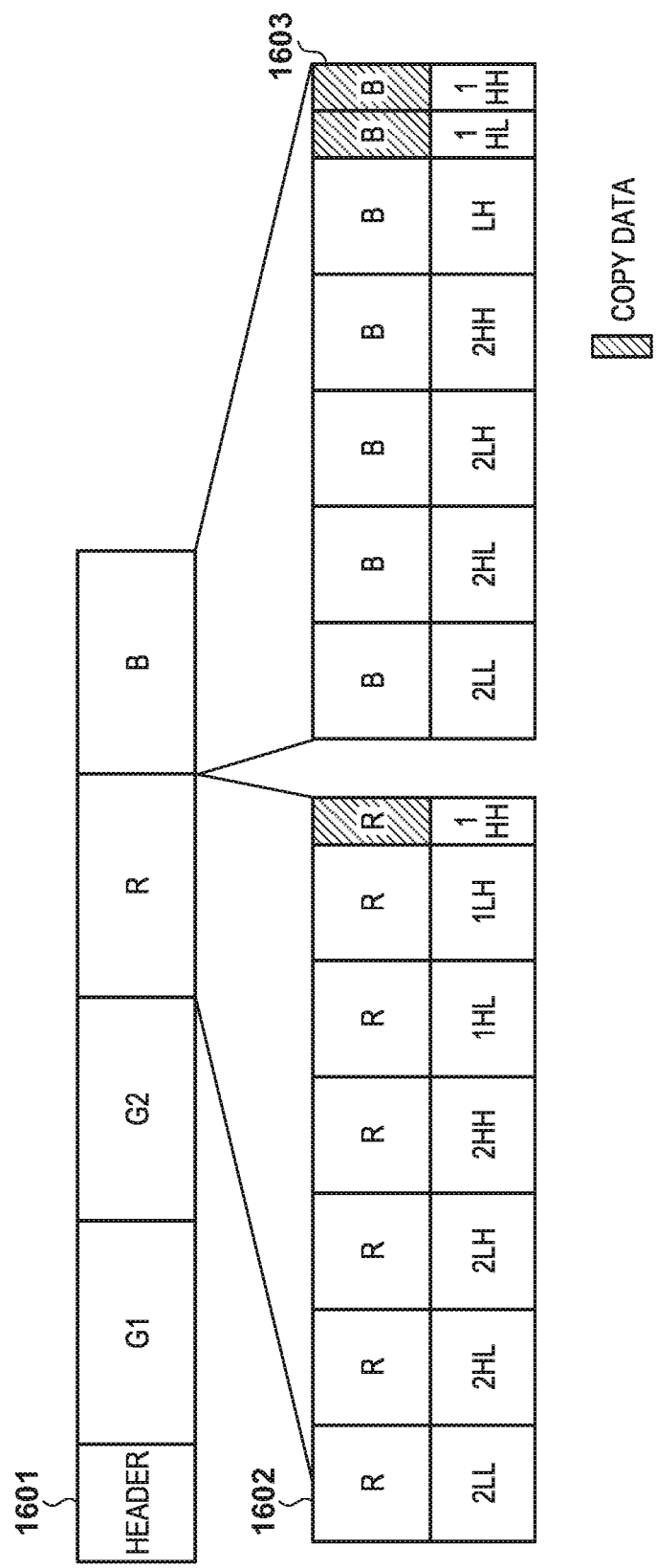
FIG. 16 is a conceptual diagram showing a value obtained by integrating code amounts of a coded stream in the fourth embodiment.

FIG. 16 is a conceptual diagram showing a structure of a coded stream in the present embodiment. Similarly to FIG. 15, here, the HH component of R at the resolving Lv 1, and the HL component and the HH component of the B pixel at the resolving Lv 1, that is, three sub-bands in total are regarded as the copy data replacement targets. The coded stream 1601 includes a coded data 1602 of sub-bands included in the R pixel plane, and a coded data 1603 of sub-bands included in the B pixel plane. The coded stream formation unit 112 changes the arrangement of the sub-bands on the coded stream, and disposes the HL component of B at the resolving Lv 1 after the LH component of B at the resolving Lv 1 so as to collectively add copy data to the end of the coded data.

Sub-bands at a high frequency are replaced with copy data in order in the configuration of the first embodiment, and thus the coded stream is generated such that the copy data is disposed after the coded data. However, the coded stream is generated such that copy data is also disposed after the coded data in the present embodiment.

Grouping of priorities for sub-bands in the manner described above, and allowing copy data replacement target sub-bands to be selected makes it possible to provide an image capturing apparatus that can suppress deterioration of image quality to a minimum at the same time as adjustment of code amounts after all sub-bands included in a picture are coded.

Note that discarding of coded data in units of the sub-bands that has been described in the second embodiment can also be applied to the present embodiment. Also, as in the third embodiment, the present embodiment can also be applied to color systems other than RGB, such as YUV.

Fifth Embodiment

In the present embodiment, for the configuration of the first embodiment, after an input image buffer 104 holds an image, the input image is divided into a plurality of rectangular tiles, discrete wavelet transformation, quantization, and coding are performed per tile, and the overflow control unit performs control such that priorities are given to sub-bands per tile to determine a copy data replacement target sub-band. The other blocks have similar configurations to the first embodiment. In the present embodiment, a two tile configuration in which the input image is divided into left and right will be described as an example.

Figure 17:
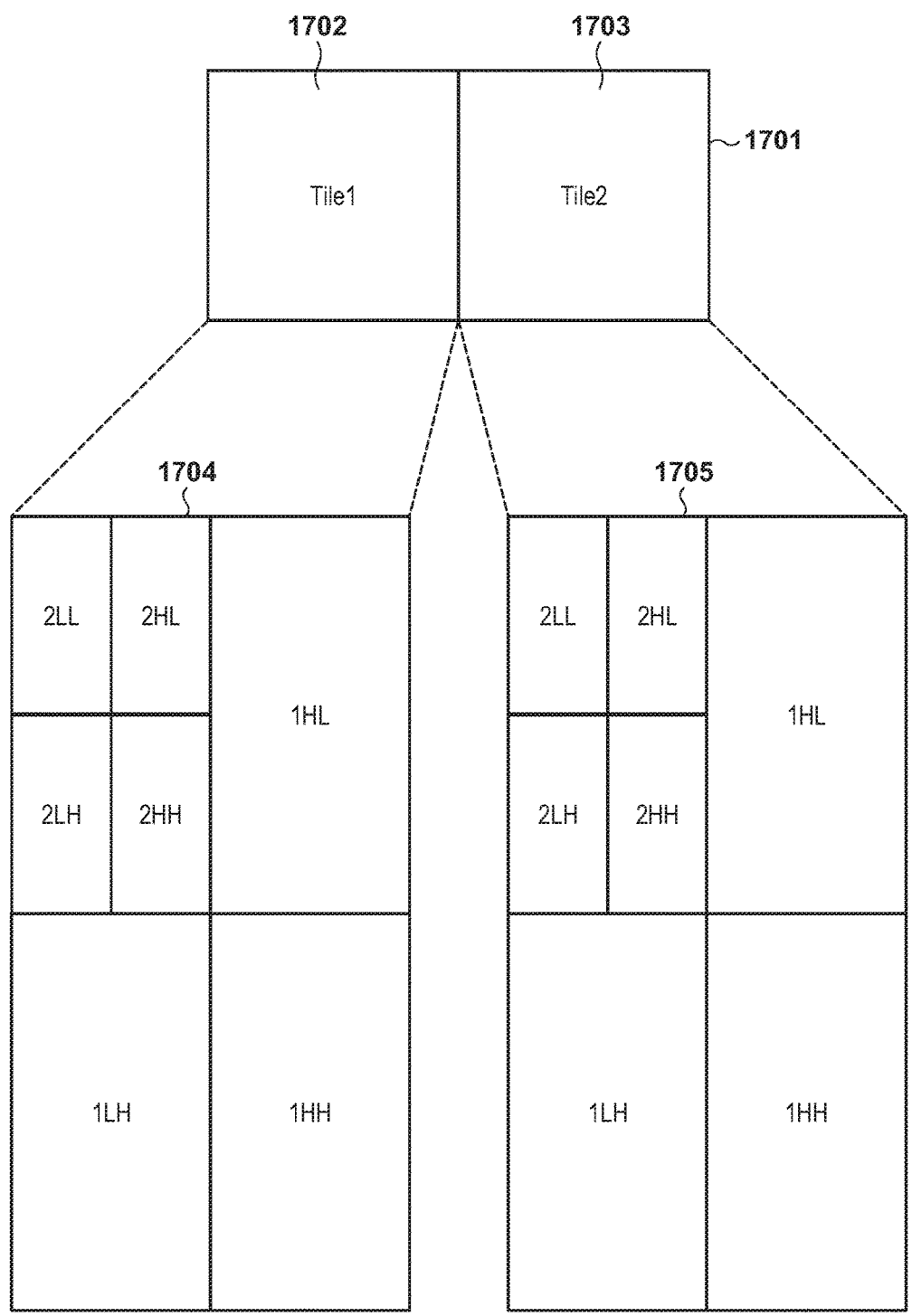
FIG. 17 is a conceptual diagram showing sub-bands in a fifth embodiment.

FIG. 17 is a conceptual diagram showing sub-bands after discrete wavelet transformation in the present embodiment. An input image 1701 is divided into a first tile 1701 and a second tile 1702. Sub-bands 1704 are generated from the tile 1702 in discrete wavelet transformation processing, and sub-bands 1705 are generated in the discrete wavelet transformation processing from the tile 1703. In the case where the input image is divided into a plurality of tiles in this manner, sub-bands per tile are generated.

Figure 18:
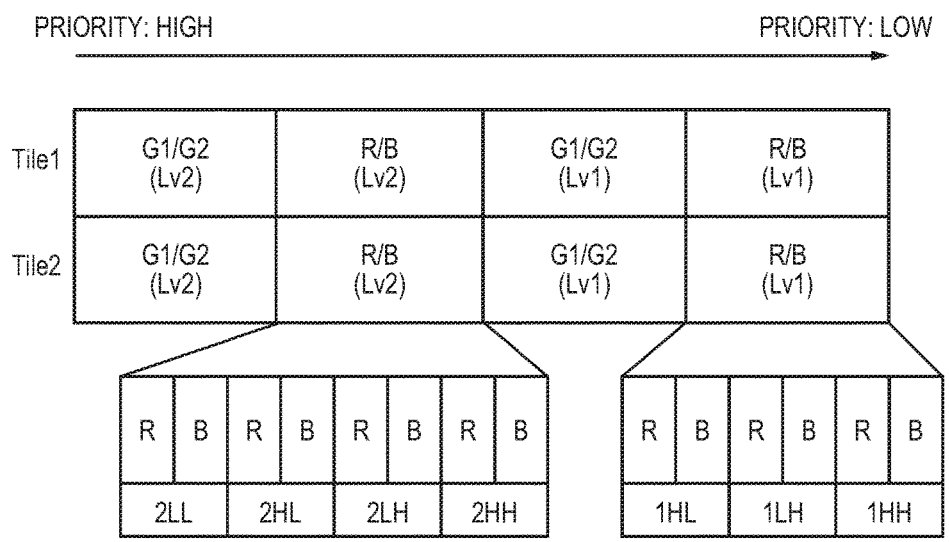
FIG. 18 is a diagram showing the priorities of sub-bands in the fifth embodiment.

FIG. 18 is a conceptual diagram showing the priorities of sub-bands in the present embodiment. The priorities of sub-bands in tiles are similar to in the first embodiment. The priorities in the same sub-bands per tile are the same. For example, the sub-band of the HH component at Lv 1 that is included in the B pixel in a tile 1 and the sub-band of the HH component at Lv 1 that is included in the B pixel in a tile 2 have the same priority. Also, with regard to sub-bands in each tile, similarly to the first embodiment, unique priorities are given to the sub-bands in this example.

When a copy data replacement target sub-band is determined, the overflow control unit 113 performs control such that the same sub-bands in all tiles are collectively regarded as replacement targets in accordance with the priorities of sub-bands. When the copy data replacement target sub-band is determined, the overflow control unit 113 performs control such that the sub-band of the HH component at Lv 1 that is included in the B pixel in the tile 1 and the sub-band of the HH component at Lv 1 that is included in the B pixel in the tile 2 are first collectively regarded as the replacement targets. The procedure of replacing the sub-band with copy data may be the procedure in FIG. 5 similarly to the first embodiment, or procedures in FIGS. 5 and 14 similarly to the fourth embodiment. Coding is possible in units of tiles by applying the present embodiment to the second and third embodiments. However, as described above, the sub-bands corresponding to those between tiles are collectively selected as the replacement targets at the same time, or are not collectively selected.

Figure 19:
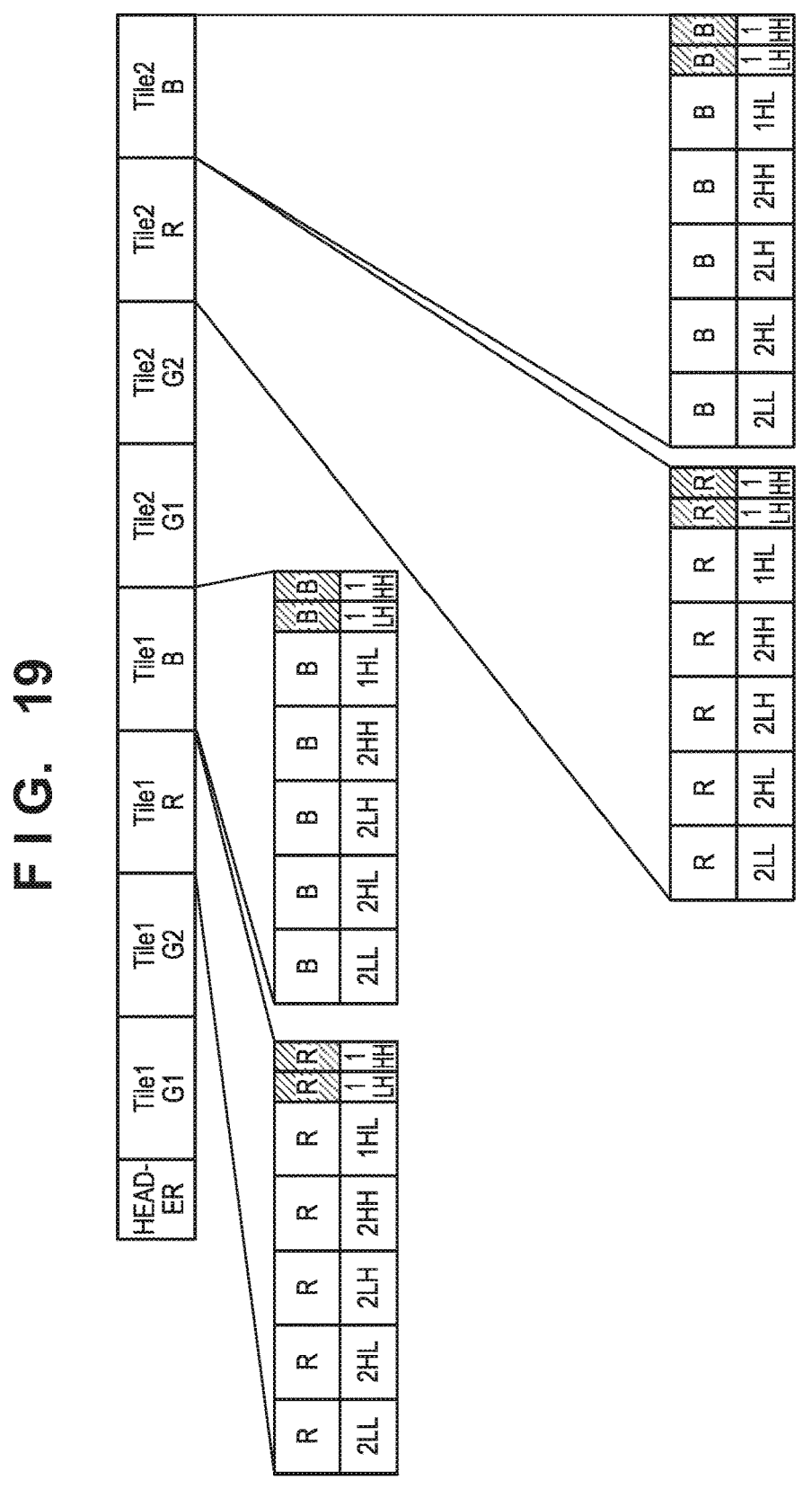

FIG. 19 is a conceptual diagram showing a structure of a coded stream in the present embodiment. Here, shown is the structure of a coded stream in a case where the sub-bands of the LH component and the HH component at Lv 1 that are included in the R pixel plane and the B pixel plane in the tile 1, and the sub-bands of the LH component and the HH component at Lv 1 that are included in the R pixel plane and the B pixel plane in the tile 1 are regarded as the copy data replacement targets. If image quality changes between tiles, distortion is seen at the tile boundary. However, with the overflow control unit 113 of the present embodiment, the same sub-bands in each tile are collectively replaced with copy data, and thus the code amounts are suppressed while the image quality is caused to evenly deteriorate between tiles, as a result of which distortion at the tile boundary portion can be eliminated.

Even in the case where the screen is divided into a plurality of tiles, doing so makes it possible to provide an image capturing apparatus that can adjust code amounts after all sub-bands included in a picture are coded, without causing distortion at the tile boundary portion. Also, the present embodiment can also be applied in combination with the second to fourth embodiments.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-209179, filed Oct. 23, 2015 which is hereby incorporated by reference herein in its entirety.

What is claimed is:

1. A coding method comprising:
    performing wavelet transformation per component of image data;
    coding the transformed data per sub-band;
    determining whether or not a total code amount obtained by the coding of the image data exceeds a threshold value;
    if it is determined that the total code amount does not exceed the threshold value, recording, in a recording medium as coded image data, the coded data of all sub-bands coded in the coding; and
    if it is determined that the total code amount exceeds the threshold value, (1) discarding the coded data, the discarding being carried out in order from a sub-band having the lowest priority until the total code amount is less than or equal to the threshold value, and (2) recording, in the recording medium as the coded image data, the coded data of which one or some sub-bands are discarded,
    wherein the coded image data is recorded in a form comprising (a) a header portion and (b) an image data portion including the coded image data, wherein the header portion includes, for all sub-bands, sub-band size information indicating a data length of the sub-band, and
    wherein in a case where the coded data of one or more sub-bands are discarded, the coded data of the discarded one or more sub-bands are not recorded in the recording medium and the sub-band size information of the discarded one or more sub-bands is recorded as zero.

2. The coding method according to claim 1, wherein the priority is determined in accordance with the component and a frequency band of the sub-band.

3. The coding method according to claim 2, wherein the lower the frequency of the sub-band is, the higher the priority is.

4. The coding method according to claim 1, wherein components of the image data include RGB components.

5. The coding method according to claim 1, wherein components of the image data include a luminance component and a color difference component, and
    wherein a priority of the luminance component is higher than the priority of the color difference component.

6. The coding method according to claim 1, wherein the image data includes Bayer pixels constituted by four components G1, G2, R, and B, and
    wherein the G1 and G2 components have the same priority, and a priority of the R component is higher than a priority of the B component.

7. The coding method according to claim 1, wherein the image data includes Bayer pixels constituted by four components G1, G2, R, and B, and
    wherein in the determining, sub-bands of the G1 and G2 components are not discarded.

8. The coding method according to claim 1, wherein the image data includes a GH component that is a high frequency component of a G component, a Y component that is a luminance component generated from an R component, a B component, and a GL component that is a low frequency component of the G component, and U and V components that are color difference components, and
    wherein the priorities decrease in order of the Y component, the GH component, the U component, and the V component.

9. The coding method according to claim 8, wherein the sub-band of the luminance component is not discarded.

10. The coding method according to claim 1, wherein in the performing wavelet transformation, the image data is subjected to discrete wavelet transformation in units of tiles that constitute the image data, and
    wherein in the discarding, if there are a plurality of the tiles, the sub-bands corresponding to the plurality of tiles are collectively discarded.

11. The coding method according to claim 1, further comprising:
    generating a coded stream in which sub-bands are disposed in order from low frequency to high frequency.

12. The coding method according to claim 1, wherein in the discarding, if the coded data is discarded, predetermined information is provided in a header of a sub-band whose coded data has been discarded.

13. The coding method according to claim 1, further comprising quantizing the data transformed in the performing wavelet transformation, the quantizing being conducted in units of the sub-bands,
    wherein the data quantized by the quantizing is coded in units of the sub-bands in the coding.

14. The coding method according to claim 1, wherein, in the determining, if it is determined that the total code amount exceeds the threshold value, the discarding is carried out.

15. A coding apparatus comprising:
    a transformation unit, configured to perform wavelet transformation per component of image data;

a coding unit, configured to code the transformed data per sub-band;

a determination unit, configured to determine whether or not a total code amount obtained by the coding of the image data exceeds a threshold value;

a recording unit, configured to, if it is determined that the total code amount does not exceed the threshold value, record, in a recording medium as coded image data, the coded data of all sub-bands coded in the coding; and if it is determined that the total code amount exceeds the threshold value, (1) discard the coded data, the discarding being carried out in order from a sub-band having the lowest priority until the total code amount is less than or equal to the threshold value, and (2) record, in the recording medium as the coded image data, the coded data of which one or some sub-bands are discarded, wherein the coded image data is recorded in a form comprising (a) a header portion and (b) an image data portion including the coded image data, wherein the header portion includes, for all sub-bands, sub-band size information indicating a data length of the sub-band, and wherein in a case where the coded data of one or more sub-bands are discarded, the coded data of the discarded one or more sub-bands are not recorded in the recording medium and the sub-band size information of the discarded one or more sub-bands is recorded as zero.

16. The coding apparatus according to claim 15, wherein the priority is determined in accordance with the component and a frequency band of the sub-band.

17. The coding apparatus according to claim 16, wherein the lower the frequency of the sub-band is, the higher the priority is.

18. The coding apparatus according to claim 15, wherein components of the image data include RGB components.

19. The coding method according to claim 15, wherein components of the image data include a luminance component and a color difference component, and wherein a priority of the luminance component is higher than the priority of the color difference component.

20. The coding apparatus according to claim 15, wherein the image data includes Bayer pixels constituted by four components G1, G2, R, and B, and wherein the G1 and G2 components have the same priority, and a priority of the R component is higher than a priority of the B component.

21. The coding apparatus according to claim 15, wherein the image data includes Bayer pixels constituted by four components G1, G2, R, and B, and wherein in the determining, sub-bands of the G1 and G2 components are not discarded.

22. The coding apparatus according to claim 15, wherein the image data includes a GH component that is a high frequency component of a G component, a Y component that is a luminance component generated from an R component, a B component, and a GL component that is a low frequency component of the G component, and U and V components that are color difference components, and wherein the priorities decrease in order of the Y component, the GH component, the U component, and the V component.

23. The coding apparatus according to claim 22, wherein the sub-band of the luminance component is not discarded.

24. The coding apparatus according to claim 15, wherein by the transformation unit, the image data is subjected to discrete wavelet transformation in units of tiles that constitute the image data, and wherein if there are a plurality of the tiles, the recording unit collectively discards the sub-bands corresponding to the plurality of tiles.

25. The coding apparatus according to claim 15, further comprising a quantization unit configured to quantize the data transformed by the transformation unit, the quantizing being conducted in units of the sub-bands, wherein the data quantized by the quantization unit is coded in units of the sub-bands in the coding.

26. A non-transitory computer-readable storage medium storing a program which causes a computer to perform a coding method when executed by the computer, the coding method comprising:

performing wavelet transformation per component of image data;

coding the transformed data per sub-band;

determining whether or not a total code amount obtained by the coding of the image data exceeds a threshold value;

if it is determined that the total code amount does not exceed the threshold value, recording, in a recording medium as coded image data, the coded data of all sub-bands coded in the coding; and if it is determined that the total code amount exceeds the threshold value, (1) discarding the coded data, the discarding being carried out in order from a sub-band having the lowest priority until the total code amount is less than or equal to the threshold value, and (2) recording, in the recording medium as the coded image data, the coded data of which one or some sub-bands are discarded, wherein the coded image data is recorded in a form comprising (a) a header portion and (b) an image data portion including the coded image data, wherein the header portion includes, for all sub-bands, sub-band size information indicating a data length of the sub-band, and wherein in a case where the coded data of one or more sub-bands are discarded, the coded data of the discarded one or more sub-bands are not recorded in the recording medium and the sub-band size information of the discarded one or more sub-bands is recorded as zero.

* * * * *